(12) United States Patent
Maimon

(10) Patent No.: US 7,089,168 B2
(45) Date of Patent: Aug. 8, 2006

(54) LANGUAGE FOR NETWORKS

(75) Inventor: Ron Maimon, Monroe, CT (US)

(73) Assignee: Gene Network Sciences, Inc., Ithaca, NY (US)

( * ) Notice: Subject to any disclaimer, the term of this patent is extended or adjusted under 35 U.S.C. 154(b) by 752 days.

(21) Appl. No.: 10/288,570

(22) Filed: Nov. 4, 2002

(65) Prior Publication Data

US 2003/0115032 A1     Jun. 19, 2003

Related U.S. Application Data

(60) Provisional application No. 60/335,333, filed on Nov. 2, 2001.

(51) Int. Cl.
    *G06G 7/48* (2006.01)
(52) U.S. Cl. ........................................ 703/11
(58) Field of Classification Search .............. 703/11, 703/22; 719/328; 715/363; 717/105
    See application file for complete search history.

(56) References Cited

U.S. PATENT DOCUMENTS

| 5,355,482 | A   |   | 10/1994 | Ohhashi et al. |
| 5,980,096 | A   | * | 11/1999 | Thalhammer-Reyero .... 707/100 |
| 6,051,029 | A   | * | 4/2000  | Paterson et al. .............. 703/22 |
| 6,539,347 | B1  | * | 3/2003  | Paterson et al. .............. 703/22 |
| 6,816,914 | B1  | * | 11/2004 | Heinzman et al. .......... 719/328 |
| 6,983,227 | B1  | * | 1/2006  | Thalhammer-Reyero ....... 703/2 |

FOREIGN PATENT DOCUMENTS

EP     0 113 460 A2     7/1984

OTHER PUBLICATIONS

Howse, J. et al, Type-syntax and Token-syntax in Diagrammatic Systems, Oct. 17, 2001, FOIS 01, ACM 1-58113-377-04/01/0010, pp. 183-183.
Kaindl, H. et al, Symbolic Modeling in Practice, Jan. 30, 1999, Communications of the ACM, vol. 42, No. 1, p. 29, line 18.
Christensen, C., Programming Languages for Non-Numeric Processing, 1965, Proceedings ACM 20th National Conference, pp. 248-250.

* cited by examiner

*Primary Examiner*—Albert W. Paladini
(74) *Attorney, Agent, or Firm*—Fish & Neave IP Group Ropes & Gray LLP

(57)     ABSTRACT

Presently described is a formal language for describing the function of biochemical networks. Because it is a language, it includes a method of parsing, or understanding the language, which is a highly complex recursive algorithm. This formal language, the Cell Language, is described both informally, so that it may be written, and formally, so that it may be parsed. The Cell Language makes it possible to model all the interactions in a cell in a single diagram, with only a few representations of each molecule. The notation is compact and modular, in the sense that complex interactions composed of many subparts may be annotated with the same symbols as the simplest interactions composed of individual molecules or genes.

8 Claims, 20 Drawing Sheets unique atoms common atoms ubique atoms is equivalent to is equivalent to is equivalent to is equivalent to this is C this is B

LANGUAGE FOR NETWORKS

CROSS-REFERENCE TO RELATED APPLICATIONS

This application claims priority to U.S. Provisional application Ser. No. 60/335,333, filed on Nov. 2, 2001, hereby incorporated herein by reference in its entirety.

BACKGROUND OF THE INVENTION

1. Field of the Invention

The present invention relates to bioinformatics and specifically to the representation and modeling of the function of biological systems and other systems with components that interact in a network.

2. Description of the Related Art

Researchers believe that the behavior of biological systems may be best understood as an abstract computation. In this philosophy the units of biological heredity are packets of information, and the cell's metabolic machinery is a layer of computation evolved with the goal of replicating the data stored in the hereditary material. This point of view has some antecedents in the biological literature, but is not prevalent.

Certain researchers also believe that the basic operations of a cell, the joining, transformation and splitting of molecules is strongly analogous to the process of flipping and copying bits of information in a computer's memory. It is well known to practitioners of the art of computer science and the mathematics of computation that both processes, while simple in isolation, can produce arbitrarily complex behavior when integrated into a network.

The basic interactions of metabolism (and in this disclosure, metabolism refers to all activity of proteins in the cell—not just those traditionally described as metabolic in the biological literature) differ from the basic interactions of an electronic computer because the cell has many different types of molecules, and each type carries information about the state of the cell. The electronic computer has a homogenous information carrier, the bit, and its fundamental interaction can be thought of as uniform, such as that described by the operation of a logical NAND gate. To describe biological networks, the language used must reflect the peculiar nature of the computational machinery of the cell.

The basic interactions of molecules, the reactions that are analogous to logical operations, are the binding and unbinding of molecule to molecule. Previous attempts to provide a standard notation for interaction networks represented interactions at the most basic level. This is analogous to a computer language composed of logical single-bit instructions only. The most comprehensive previous attempt to describe the function of biomolecules is Kurt W. Kohn, *Molecular Interaction Map of the Mammalian Cell Cycle Control and DNA Repair Systems*, Molecular Biology of the Cell, 10:2703–2734, August 1999, incorporated herein by reference in its entirety. Kohn's technique is sufficient for annotating very simple networks, and it is apparent that a higher level of description is required for compactness and readability when attempting to annotate and model complex networks.

Kohn's notation describes all the reactions in a network one by one, and differs very little from a listing of all the chemical reactions in a biological system. This method of description has shortfalls that are shared by all other existing methods, and render them incapable of representing biological function in any meaningful way.

They are over-specified—when several molecules combine, the result does not necessarily depend on the order in which they bind. In Kohn's notation, binding is a primitive object, which means that when more than two objects come together, the representation of the collection is by a sequence of bindings. This is a disadvantage, because the order of binding might not be known, and it might not be important. The description requires the user to specify more than is necessary to describe the function of the network.

Thus, even very simple systems require a very verbose description. A molecule with three binding sites which can bind three molecules independently is represented by a forest of lines in Kohn's notation (see FIG. 1 of the attached drawings). The situation is no better in other notations. For example, a listing of all the chemical reactions in chemist's notation will be just as verbose.

Additionally, existing notations are redundant. Consequently, it is impossible to say that the action of several different molecules is the same. In existing notations, we must specify the bindings again and again. This leads to overestimating the number of parameters required to describe the system because analogies between them are missed. For example, if three molecules A, B, and C are similar and bind to D in the same way, there are two parameters to describe the binding, the shared binding/unbinding rates. In a usual description we would count six different independent parameters, Additionally, existing notations are limited in their domain of applicability—there is no way to define modules or higher order structure in existing notations, and abstract, high-level function cannot be described in the same way that low-level functions such as binding and unbinding are described.

Kohn's notation, and the more primitive notations traditionally used in biochemistry suffer from these problems because they are notations, not true languages. In this disclosure, the word "notation" will be used for systems of symbols in one-to-one correspondence with the objects they represent. One piece of a notation may be translated into meaning only by referencing a bounded number of other pieces. In the computer science literature, notations are known as finite-state-automaton languages, or regular expression languages. In the linguistics literature, they are known as type 1 languages. An example of a notation is the circuit-diagrams of electronics. These structures may be translated into circuit elements and wires by a direct map—a line is a wire, a pair of parallel lines is a capacitor, etc. The word "language" is reserved for a system of symbols where the algorithm to produce the meaning requires reference to an arbitrarily large chunk of the utterance during the process of translation. This is a qualitative, not quantitative difference, and it is well known to computer scientists. An example of a language is English, where the structure of a sentence, with it's many parts which sometimes nest deeply other times not, is hierarchical. In linguistics, these are known as type 2, type 3, and type 4 languages, and in computer science they are known as context-free pushdown automata languages, context-dependent pushdown-automaton languages, and general automaton languages. Each of these classes is a superclass of the previous one, so that a context-dependent pushdown automaton language is a special case of a context dependent language. For purpose of clarity, we will call a system of symbols which requires an automaton which is more complicated than a finite-state automaton a language. A language is different from a notation because, among other things, a language requires more than just a map of symbols to meanings to be understood. A language requires a recursive algorithm to comprehend it. A language is a "formal language" when the algorithm to understand all its utterances is known and may be translated by a mechanical or electronic device, such as a general purpose computer. English is not a formal language in this sense, but the computer language FORTRAN is. Unless indicated otherwise, the word language will mean a formal language which requires more than a finite state automaton to parse.

SUMMARY

The invention is a formal language useful for, but not limited to, describing the function of biochemical networks. It includes a method of parsing, or understanding the language, which may be a recursive algorithm. In one realization, the language involves three features—two types of nested structures (likeboxes and linkboxes), state definition via implicit likeboxes, and historical resolutions. It may also combine each of these features.

This formal language, the Cell Language, is described. It is described both informally, so that it may be written, and formally, so that it may be parsed. The formal part of the language differs slightly from the informal part. The Cell Language makes it possible to describe the interactions in a cell in a single diagram, with only a few representations of each molecule. The notation is compact and it is modular, such that complex interactions composed of many subparts may be annotated with the same symbols as the simplest interactions composed of individual molecules or genes.

Also provided is a parsing methodology or algorithm for processing the networks represented by this language and interpreting them as models. In this disclosure, a model is any collection of data that describe a system and change with time according to fixed rules. The word "model" includes models of cells and other biological systems, but is not limited to these. For purpose of illustration, we shall refer to biological models frequently, but we do not intend by this to limit the domain of applicability of the invention, since it may be used to generate models in many domains. The invention operates by representing biological elements and processes abstractly, as "nouns", "verbs", "lines," and "modules" in a language that allows automated parsing and unambiguous model-generation. The Cell Language comprises multiple grammatical structures and an associated syntax, which is described herein. It is also completely shape-independent, such that any collection of symbols or library of symbols can represent the fundamental elements of the present language, and its grammar and syntax are readily translatable to these new symbols. This property of shape independence is a completely different property from the property of modularity, described in the previous paragraph.

Furthermore, this language can represent reactions involving nested structures such as the compartment, and overlapping or nested structures, the likebox, which means that the present invention can be used to describe computational models of chemical and biological activities of very large size with a very small representation.

Using the language, a practitioner of the arts can give a precise description of a network's interaction topology—the network topology is the diagram which describes the network. Thus, the language allows us to give an unambiguous definition to the concept of network topology, and this is a result of the application of the Cell Language. The language defines the topology of a biochemical network with no reference to the kinetic rates of the chemical reactions or transformations involved.

The present invention, in one practice, explicitly separates its syntax for verbs (e.g. chemical reactions) and nouns (e.g. molecules) and allows automated parsing into models. However, it is possible to automatically parse languages that do not separate nouns and verbs as well.

In typical cellular reactions, the exact mechanisms of the reactions (the verbs in this context) may be known or unknown, and the inputs, outputs, and catalysts (for example) may be known or unknown. By describing a process in terms of the known or unknown verbs and known or unknown nouns, the present invention can produce modules of the known or unknown reactions and the components in the description can be identified and described in terms of their characteristics. The characteristics of verbs may include, in some embodiments, reaction rate, time delay, variance of the time delay, functional form, computer language in which they are described, the statements in said language which comprise their description, the data-structures required to model them, and many other characteristics too diverse and numerous to list. The characteristics of nouns include reactant or catalyst concentration, number-type (defined later in the disclosure), data-type used for modeling, language used for modeling, and many other characteristics too diverse and numerous to list.

The definition of the characteristics of a noun is a data structure. This is a sequence of bits and bytes in a computer memory, or a configuration of a mechanical device. The definition of data-structure is well known in computer science. We shall reserve the word "noun interpretation" for the precise data-structures that we associate to each noun. This may vary in different implementations of the invention.

The definition of the characteristics of a verb is a computational function or subroutine. This function operates on the data structures of the nouns to produce new nouns, and the model is defined in terms of the action of the verbs on the nouns. We describe two closely related verb-interpretations along with the noun interpretations.

The preferred written form of the language is pictorial. The pictorial representation takes the form of a drawing, and the drawing may be thought of as an utterance in the language, like a sentence is an utterance in the English language or a LISP S-expression is an utterance in the LISP computer language.

The pictorial representation may be understood as one representation of an abstract diagram. "Abstract diagram" may be understood as a collection of objects which are connected to other objects, contain other objects, and reference other objects, where the concepts of connection, reference, and containership are primitive.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

Figure 1:
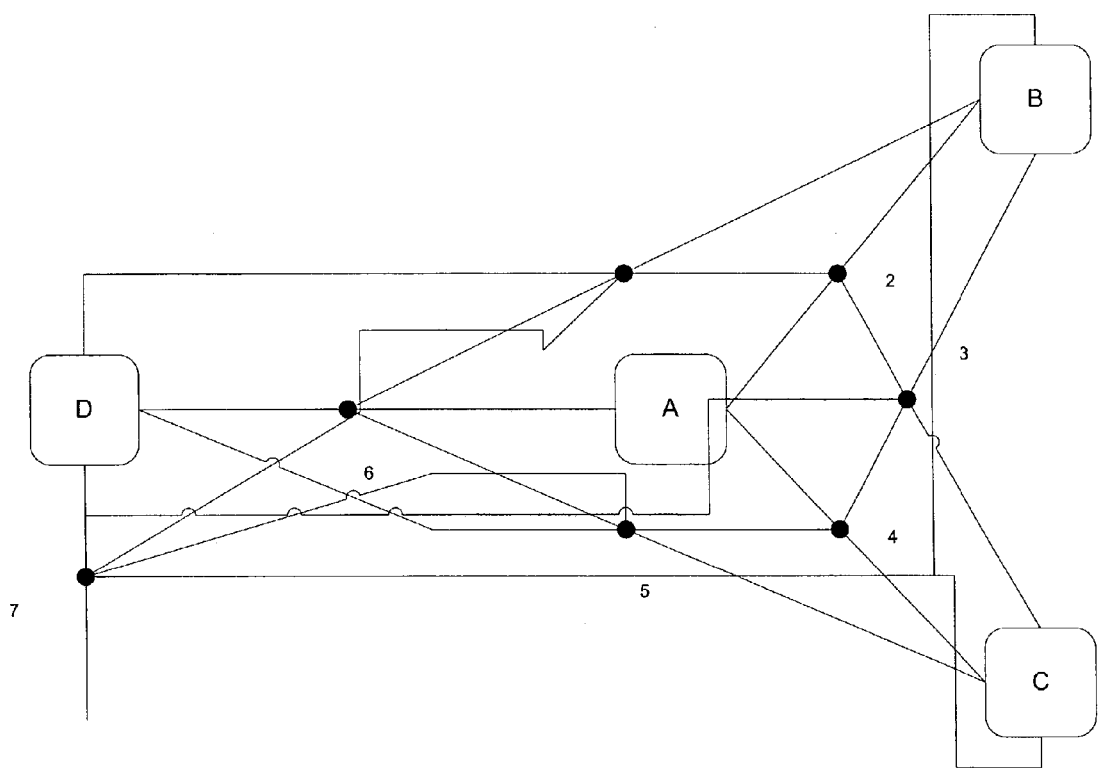
FIG. 1 illustrates Kohn's representation of the independent binding of molecules B, C, and D to A.

A biological system is a collection of chemical reactions that serve a computational purpose. The molecular species serve both as the memory of the computational device and as its program, through the reactions they undergo. The dual role of molecules as both data and program is analogous to the programming of an electronic computer, but where the program modifies its own code.

The Cell Language presently disclosed is a language for biological and chemical computation. It is an attempt to standardize a higher level language for biological networks, in the spirit of FORTRAN, LISP, and C. This notation is unambiguous in that it translates, via appropriate algorithm disclosed herein, into a unique, computer-implemented model of the cellular reactions it represents. Uses of Cell Language include: simulation of existing forms of life, creation of new forms of life, modeling parallel algorithms, modeling chemical reactions, and creation of chemical computers.

For example, we may use a polymer of arbitrary length which grows and shrinks to store data, and the structure of this polymer may be represented in the language. In this polymer the presence or absence of some "noun," a chemical, at specific sites on the polymer could denotes the presence of absence of a "bit" of data in the memory. The flipping of the bits may be represented by verbs in the language, and by modeling this and other biological/cellular computational processes, the present invention may be used to describe, design, or simulate (or some combination thereof) a chemical computer.

The notation described has at least two useful features: the same notation can describe modules and individual reactions and molecules, and the notation (or large parts of it) can be mechanically parsed into a model. When the reactions have a rate which is specified as a function of the concentration of the reactants and when the diagram obeys some technical conditions the diagram readily and directly translates into a model. Recall that a model is defined a collection of data-elements and algorithms that change with time. This is not just quantitatively more efficient that currently known notational schemes—it is qualitatively different, because none of the other notation schemes are designed to turn into models.

The language is primarily an abstraction and has many implementations. Although we focus on the pictorial language, we also can generate the same abstract structure of the diagrams from a text string. This should be apparent to the average practitioner of the art of computer science from the existence of text descriptions of diagrams, such as the PostScript language. It is possible, though technically involved, to extend the text language to allow us to generate diagrams of any size with a small text string. One of ordinary skill in the art will recognize that alternate languages lie within the scope of the present disclosure. Likewise, the methods by which the language may be implemented are not restricted to manual drawings or computer drawings. The present disclosure is not limited in scope to the precise symbols used, nor is it limited in scope to the specified means we used to store, parse, draw, or display the diagrams.

Pictorial Description of Objects Which are Acted Upon by the Grammar and Generative Rules of Different Parts of the Language Here we describe a commonly used diagrammatic description of the diagrams. In this embodiment of the Cell Language, a drawing which corresponds to an abstract diagram consists of a series of rounded rectangles, sharp corner rectangles, circles, lines, and squiggles, filled circles, triangles, and other shapes as described below. Some objects may be classified into one of two general categories: noun and verb. The other objects are lines and modules. Parsing the language by any method requires multiple, iterative passes over an entire diagram or arbitrarily large parts thereof, because the nouns may be primitive or compound nouns and the compound nouns may contain or refer to others in a recursive way, either directly or through their history. When we say that the reference may be recursive, we mean that the objects referred may themselves refer to others, and to understand even a small part of the diagram we might be forced to consider arbitrarily large numbers of elements of the diagram. This is the reason that we call the description a language.

The pictures we use consist of: closed curves made up of horizontal and vertical lines joined by rounded corners, closed curves made up of horizontal and vertical lines with sharp corners, squiggles, lines, jigsaw pieces—which are square shapes with semi-circular holes on the side, and a small palette of control nibs consisting of triangles, circles and lines. Each shape has a corresponding abstract language element.

Figure 2:
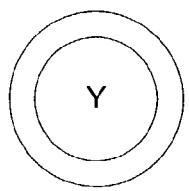
FIG. 2 illustrates several simple nouns (atoms) in the Diagrammatic form of the Cell Language.
Figure 2:
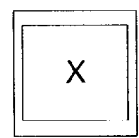
Figure 2:
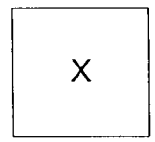
Figure 2:
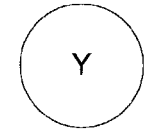
Figure 2:
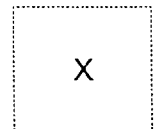
Figure 2:
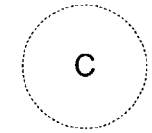

The smallest noun units in the description are the "atoms," shown in FIG. 2. These are not the chemists' atoms, but are more like the ATOMs of LISP. They are indivisible units of biological function. A gene may be represented as an atom, as can a binding site on a complex protein. The entire protein may be represented by an atom, if it can only bind one chemical at a time. A messenger RNA (mRNA) molecule is frequently represented as an atom, since transcription and translation treat it as a unit, and these are the primary actions that mRNA participates in.

Not only molecules, but abstract conditions, such as metaphase, may be represented as atoms. The two states Metaphase-on and Metaphase-off although they indicate a complicated proportion and position of many molecules in a cell are atoms. A process that causes metaphase to occur may be represented as the throwing of a switch, the transformation of the atom representing Metaphase off to the atom representing Metaphase on. Because these are conditions, they must transform in a one to one way. When one condition is destroyed, another condition is created.

Some atoms are single-copy, an allele, or a condition switch, while others represent molecular species. Different types are modeled differently, so it is essential to distinguish the different types of atoms from each other.

We are defined three basic types of atoms. They are distinguished by their number-type, which we define to be one of "unique," "common," or "ubique." Every atom is contained in a container, which is defined as an object that holds others inside, but for the purposes of introduction, one may imagine that there is only one container and that this container is the whole diagram. Later we will define other containers. An atom of unique number-type is called a unique, an atom of common number-type is called a common, and an atom of ubique number-type is called a ubique. The interpretation associated with the uniques, commons and ubiques is listed below:

Uniques: These are atoms that have at most a single occurrence in their container. The centrosome, a metaphase switch, or a single copy of a gene can be represented by a unique, since there is only one centrosome in a cell, only one of a single copy of a gene, and only one condition called metaphase. To clarify: uniques are either present or absent. They are characterized by their presence or absence, not by the number of copies. In a cell, they represent on-off conditions, such as metaphase-on or metaphase-off, or they can represent parts of actual molecules with a single occurrence. A single copy of a gene is such a molecule-part. So is a promoter region. The uniques define different states, not just for the cell, but for an arbitrary container, whether they are abstract or concrete.

Commons: These atoms are found in many copies, but have dynamics. Proteins, mRNA, slow diffusing molecules, and calcium ions can be represented by common atoms in many cells. To clarify: commons are atoms which can exist in multiple copies in the container they are in. They aren't states of the container. They are not just present or absent, but have possibly more than one copy. The number of copies of each common atom that is in the cell can vary with time in a way determined only by the verbs that the atom is connected to.

Ubiques: These can represent small molecules which diffuse so quickly and come to equilibrium so quickly that they have no dynamics at all but have a constant concentration in the cell. Phosphate groups, ATP, individual amino acids and nucleic acids, most ions, and small molecules in general can be represented by ubiques. To clarify: ubiques are best thought of as parameters which vary in a way not determined by local actions. The concentration of ATP, for example, may be varied by controlling the metabolic rate of a cell. The model can represent this by letting the concentration of ATP be a pre-specified function of time, and then the model uses this concentration to calculate the rate at which reactions involving ATP proceed. The ATP should then be represented by a unique.

It is helpful to point out that the representation of objects as uniques, commons, or ubiques is just a representation. There is no meaningful sense in which we can say that ATP "is" a ubique, because in another model of cellular function, we might count the number of ATP molecules, and consider the actions by which it is produced and consumed as part of the model. In this case, ATP would be a common. The number-types of atoms reflect their role in a model, not an independently existing biological truth.

The three types of atoms are defined abstractly, and it hardly matters how they are represented by drawings. In order to use the language, we must make an arbitrary choice, and this is the choice we have made: a unique is represented by a double line box or circle, perhaps containing a name. A common is represented by a single-line box or circle surrounding an optional name. A ubique is represented by a name alone, or by a dashed circle or dashed box surrounding an optional name. FIG. 2 shows examples of the representation of uniques (Metaphase-On, Centrosome) commons (Ras, P53), and ubiques (P, ATP, Ca).

The atoms are the simplest nouns; the simplest verbs are the actions. Language actions differ from the chemists' reactions, since language actions may be arbitrarily complex and may transform abstractions, not just molecules. This is true even though every action has sequential composing reactions when it is represented in terms of chemical reactions. The formal definition of an action is a process that transforms any set of nouns to another, at a rate regulated by a third set of nouns. The nouns that the action consumes are called the inputs, the nouns it produces are called the outputs, and the nouns that control the rate of transformation are called the controls. When the action happens, the inputs are destroyed, the outputs are created, and the controls are unaffected.

There are three types of actions, each distinguished by their speed. In this disclosure, speed doesn't mean rapidity, but an analog to number-type for actions. Just like an atom may be common, unique, or ubique, a verb may be fast, regular, or slow. We point out that although it might seem convenient to include binding as an action, it turns out that binding is always better thought of as a module. Each action has its own symbol:

Regular: A regular action, which is also called a reaction, is a fast joining together of the inputs, and then, with no delay in time, a production of the outputs. Note that the word "reaction" is to be understood as shorthand for the words "regular action," although the coincidence of this term with the word usually used to describe chemical transformations is intentional. Reactions are close analogs to chemical reactions, although they are an abstraction of this idea. A reaction has no memory, because it happens instantly. This distinguishes it from a slow action. The diagrammatic or pictorial form for a reaction is a single-line squiggle joining lines attached to the inputs to lines attached to the outputs. There is an optional arrowhead on the squiggle. If the arrowhead is present, the tail-end of the squiggle is where the inputs are attached, and the head-end is where the outputs are attached. If there is no arrowhead, the reaction is reversible. Additional lines may end on the center of the squiggle and these represent control lines. Note that what is traditionally called a binding is a special case of a reaction, a reaction with two inputs and one output. This means that the notation can represent binding without a new symbol.

Figure 4:
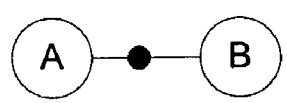
FIG. 4 depicts the reduction of a binding symbol to actions and atoms
Figure 4:
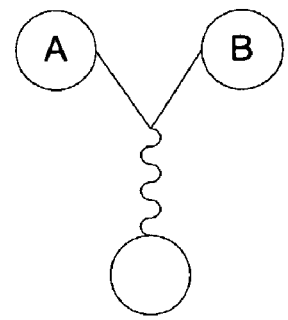
Figure 4:
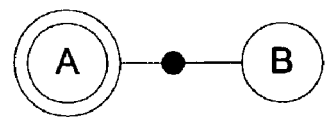
Figure 4:
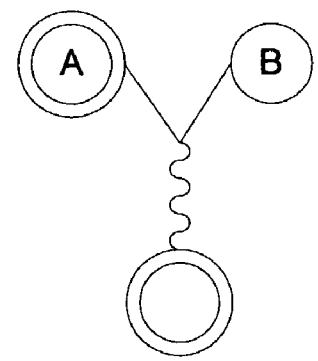
Figure 4:
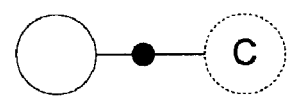
Figure 4:
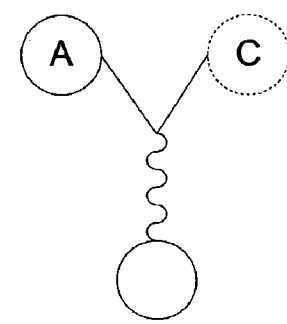
Figure 4:
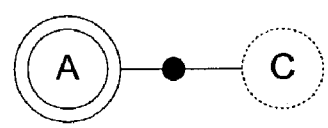
Figure 4:
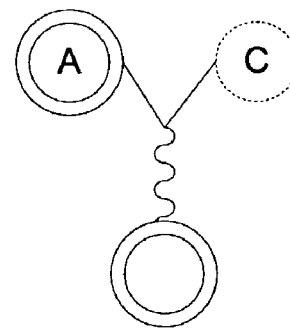

Slow: These also take multiple inputs and produce multiple outputs, but they have a time delay for one reason or another. They take time to complete. They might be called "processes" as well, but we reserve this term for future use. In order to calculate the production rate of the outputs, the model must remember the history of the simulation, because the inputs might have come together a long time ago, and not yet come out of the slow reaction. This means that slow verbs remember the entire history of the inputs, since inputs that entered the process at a much earlier time might still be present in an intermediate stage. Slow actions are represented by a double squiggle, with arrows to indicate irreversibility, as shown in FIG. 4.

Fast: A fast action is one which is always in some sort of equilibrium. It represents a constraint on the variables in the model. For example, if the concentration of active protein is always equal to the square of the concentration of transcription factor (this can happen when the transcription factor binds twice to the promoter, and its concentration is constant over the time scale required for transcription and translation), the two are linked by a fast action. Fast actions might not be fast in the sense of occurring quickly, but they must constrain the nouns to satisfy an instantaneous constraint. This can take the form of an algebraic equation, such as (C=kPP), which says that the concentration C of a protein is proportional to the product of a constant k times the concentration of promoter P times the concentration of promoter P. A fast action is represented by a dotted squiggle with an arrowhead.

The distinction between a slow verb and a reaction is not a sharp one. If an action takes a minute to proceed, but all the inputs vary on the time scale of hours, the process may safely be modeled as an instantaneous reaction, with irrelevant error. If, on the other hand, the process takes a minute, but the reactants vary on a time scale of seconds, it must be modeled as a slow verb. Similarly, in some models a reaction might cause the inputs and outputs to be related algebraically because of the dynamics. If this is the case, then the reaction may be replaced by a fast action.

Notice that each action may be reversible or irreversible. If the action is reversible, the picture is symmetric between inputs and outputs—it doesn't say which is which. When a reaction, slow action, or fast action is reversible, it doesn't matter which side is input and which side is output. The picture has the same interpretation either way.

Figure 3:
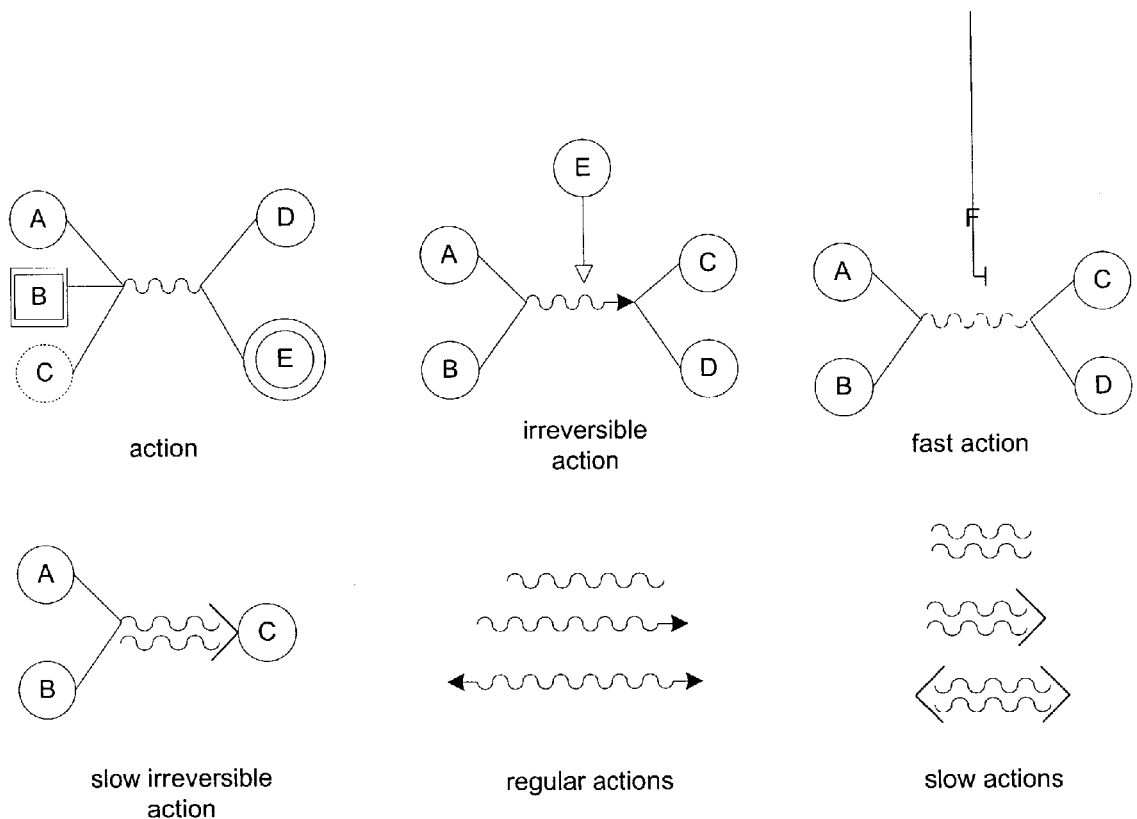
FIG. 3 shows some representative action symbols.

Examples of slow, fast, and regular actions are provided in FIG. 3. There are examples of both reversible and irreversible actions.

Note that lines are used to attach the nouns to the verbs. The lines are objects too, since they will have properties such as a resolution string. They can also contained inside containers such as the linkbox.

In order to reduce clutter, it is convenient to annotate different actions in different places. The equivalence allows two nouns (atoms, nounboxes, or linkboxes) in the diagram to represent the same entity. Using equivalences, the modeler can describe different actions a particular object participates in without cluttering the diagram with lines. The equivalence is denoted by a dashed line attached at both ends to one line which ends on a noun. The dashed line is called an "equivalence line." FIG. 4 depicts some equivalences used in a small sample network. In the Figure, the molecules connected by dashed lines are equivalent. Furthermore, the names connected to dotted lines are names for the atoms that they connect to. This is probably the most trite use of an equivalence line. The equivalence line is best thought of as a second type of primitive verb. It is very loosely analogous to the "to be," or "is identical to" in English. An equivalence line suggests that two objects are the same in many ways. Its precise meaning is defined the algorithm that produces a model from the diagram, but the flavor of this meaning can be introduced here. The precise definition requires an understanding of likeboxes, linkboxes and compartments, which have not yet been introduced.

If two atoms in the same container are connected by an equivalence line, the two atoms are the same atom. They both must have the same number type, and if they have different names, the two names are aliases for the same object.

If two nouns in the same container are linked by an equivalence line, and one participates in one set of actions and the other in another set of actions, the data structure represented by those atoms participates in the entire set of all the actions that the two participate in separately. In this way, the complete list of actions for an object can be listed in separate parts of a diagram..

Linkboxes and Likeboxes

Figure 5:
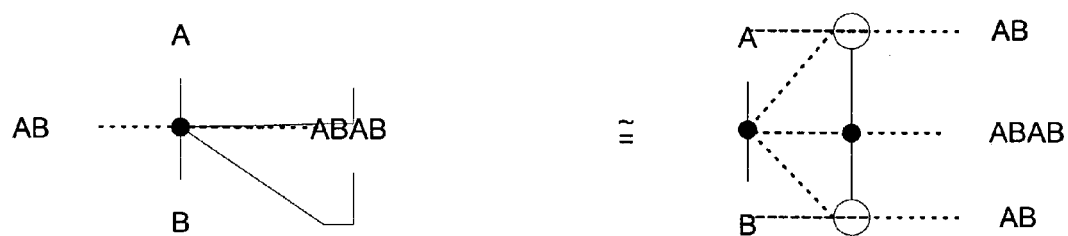
FIG. 5 depicts the equivalence line
Figure 6:
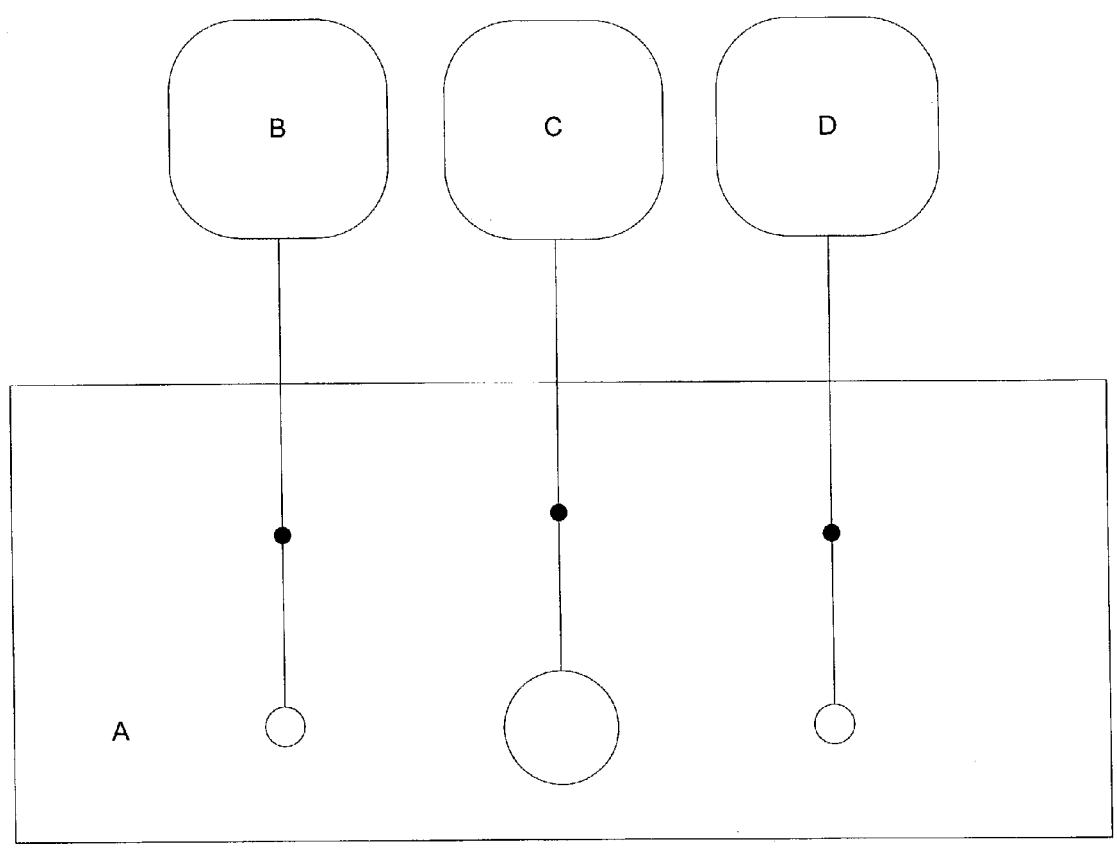
FIG. 6 depicts the symbol for the linkbox

One complex grammatical element in the Cell Language is the linkbox, depicted in FIG. 6. A linkbox is represented by a closed sharp-cornered curve with no self-intersections composed of horizontal and vertical lines only. Very often, it is just a rectangle. If the linkbox shape has no other shapes inside it, it is not a linkbox—It's just an ordinary atom! If the linkbox shape is a double-line the linkbox is unique. If the linkbox shape is a dotted line, the linkbox is ubique. The lines, circles, and squiggles inside the linkbox are called its contents, and the objects they represent are said to be contained in the linkbox. The symbols for linkboxes containing atoms only are illustrated in FIG. 5.

The linkbox is a noun that can represent the physical or abstract joining of one, two, or more nouns. Placing two atoms in a linkbox represents the two atoms present simultaneously. A protein can be represented by a linkbox of its binding sites; DNA can be represented by a linkbox of the genes it contains. Objects joined with a linkbox will diffuse together if the action of diffusion is included in the model, and participate in reactions as a whole, in the sense that they are linked together. Linkboxes may also refer to subparts of linked objects, but when they do, we call them "Interior Linkboxes," and we do not call them linkboxes. The interior linkbox represents the state of the subpart of the object. If an interior linkbox surrounds the bound form of a representation of two binding sites in a protein with seven binding sites as in FIG. 6, the interior linkbox represents the protein with the two binding sites occupied, no matter what the state of the other binding sites. Along with the equivalence line and the resolution the linkbox allows the modeler to refer to a state of a molecule with a minimal amount of diagrammatic complexity.

A linkbox is an object composed of other objects, and is a noun, like the atoms are nouns. The analogous objects for verbs are the processes, but we choose to limit the scope of the disclosure to the language without processes for the simple reason that the only processes we have found useful so far are the slow verbs, and slow verbs are much simpler than a general process, because they are only defined by their time delay properties.

Figure 7:
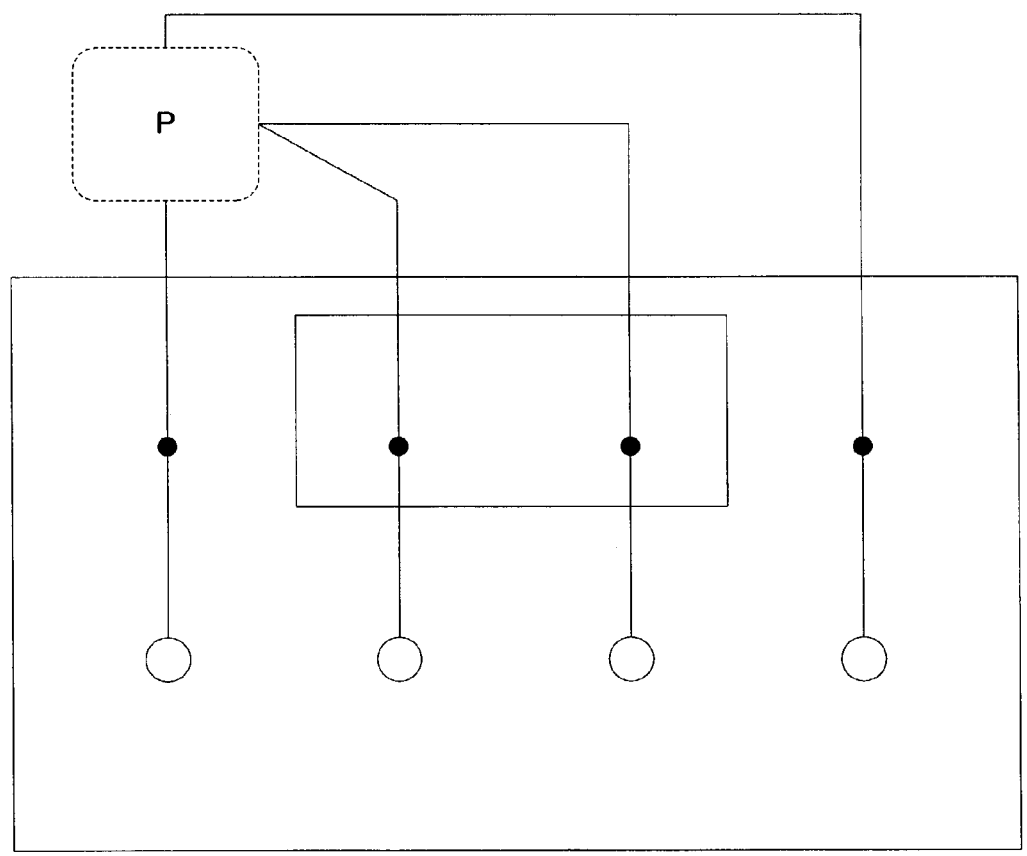
FIG. 7 depicts the symbol for an interior linkbox.

With the language introduced thus far, we may annotate many networks. The language introduced thus far is also somewhat modular since it includes both actions and composite nouns. But we must introduce a further notation to allow the diagrams to talk about nouns and verbs with similar properties. The likebox is the second fundamental grammatical element. The likebox defines sets of nouns that act alike, as shown in FIG. 7. Any element of the likebox shares the actions of a likebox. The shape of a likebox is a closed curve consisting of horizontal and vertical lines with rounded corners joining them.

A likebox surrounds a set of atoms or linkboxes or other likeboxes. A likebox (we used to call the same thing a nounbox, but this word fell out of favor for some inexplicable reason and now sounds dated—we don't use the term nounbox in this disclosure) is a noun. It participates in actions as an input, and output, or a control.

Simple Examples

Figure 10:
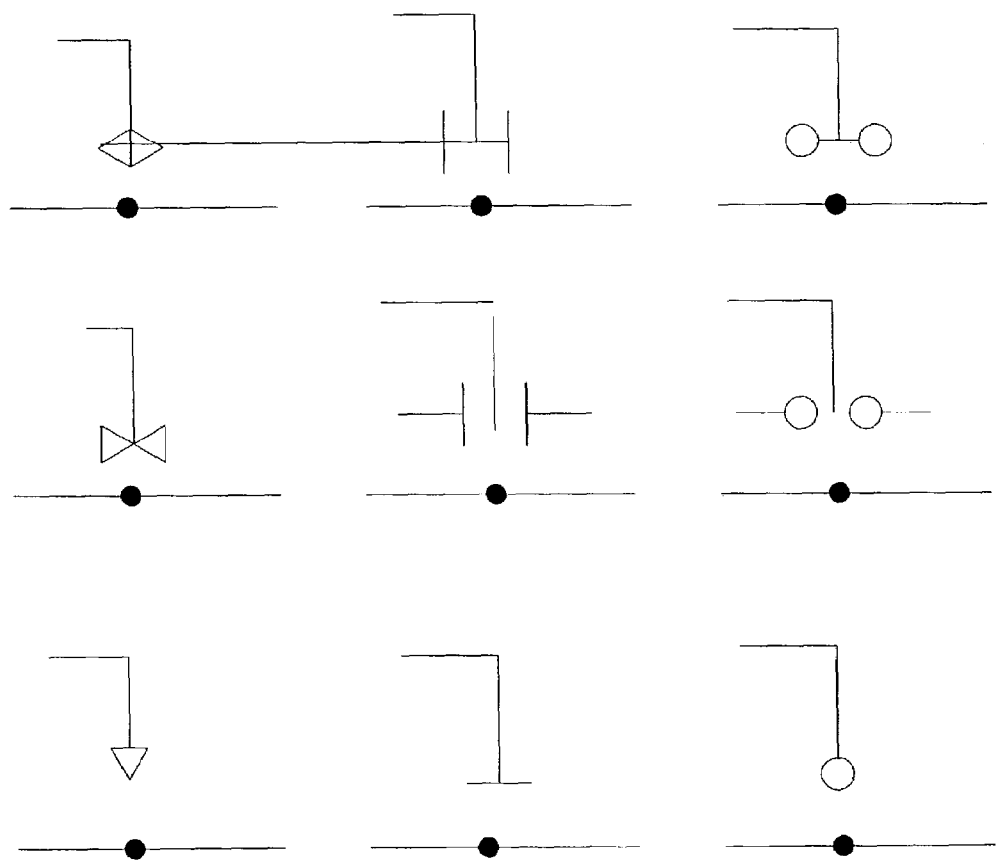
FIG. 10 illustrates the nib shapes used with the binding shorthand

The first example of the notation is a set of simple binding reactions, diagrammed in FIG. 10. P, Q, S, and T can represent four transcription factors which bind to four binding sites on a promoter, represented by the linkbox. P Binds to the first of the four binding site, Q binds to two others, and S and T bind competitively to the last. This example illustrates how a linkbox is used to describe non-competitive binding. The same diagram is shown again, this time without the binding dot symbol, which is described in the additional notations section. This diagram shows that the binding dot may be replaced with a reaction with two inputs and one output.

Additional (Alternate) Notations

The representation of binding is special because binding contains both a noun and a verb. The noun is the bound state and the verb is the reaction of binding and unbinding.

Figure 11:
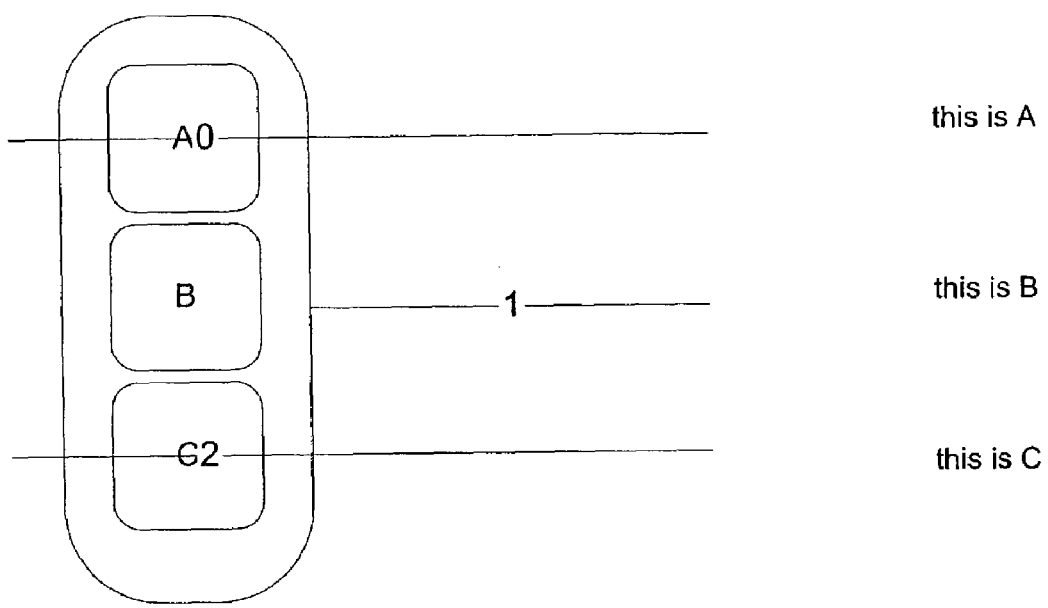
FIG. 11 shows an example of the numbering of likeboxes.

To annotate this, we use a shorthand pictorial notation (which is a filled circle called a binding dot) with two lines at opposite ends, which end at the nouns that bind. The lines that start on the binding dot and end on nouns must be paired at opposite sides of the dot, and come out at exactly opposite directions. The binding can in every case be replaced by a 2-1 reaction, as illustrated by FIG. 11.

The binding is the simplest module. A module is an object that contains both nouns and verbs, and is neither a noun nor a verb itself. The binding can be used as a noun, since it may be linked to actions, like any atom. The interpretation of this is that the bound state participates in the action. The binding may be connected to pairs of nouns at opposite ends, like a verb. The interpretation of this connection is that the nouns are inputs to one of the reactions that produce the bound state. There is precisely one reaction for every pair of opposite lines ending on verbs, as illustrated in FIG. 11. Because binding is defined as a module, it is completely superfluous to the language.

In a cell, enzymatically catalyzed reactions are so common that it is essential to have a diagram element that can represent these. In an enzyme catalyzed reaction, the enzyme is both a reactant and a product, or neither a reactant nor a product, depending on ones point of view. In one representation of the language, the enzymatic reactions are considered shorthands for reactions with an enzyme as both a reactant and a product. But in the most useful embodiment, the idea of enzymatic reactions is promoted to be a primitive of the language, not just a shorthand. This change is not significant for the modeler, since the pictures that represent enzymatic action remain the same, but it slightly changes the formal definition of the diagram. In particular, actions have control-lines, which are the connections to the nouns that act analogously to enzymes.

The default assumption in chemistry is that an enzyme is unchanged by the reaction. This representation of an enzyme is by a line with a nib ending on a verb—this is called the control line. The end of the line has an arrowhead which describes the type of enzymatic action.

To recapitulate and clarify: in addition to inputs and outputs, actions have control nouns which affect the rate of the reaction but are not produced or consumed by it. These are analogous to enzymes, and may be used to represent the effect of enzymatic action abstractly. The lines for controls start at the controlling noun and end on the action that is being controlled. The lines end at the center of the verb, and they have a nib to represent the type of control.

There are four basic types of enzymatic actions:

Do Nothing (illustrated in FIG. 9): this means the enzyme does nothing to the reaction. It is useful when resolving likeboxes or other nouns to indicate that certain components of a likebox do not act. There is no arrowhead symbol for a do-nothing, we use no nib.

Catalyze (illustrated in FIG. 9): The enzyme is required to catalyze the reaction. It cannot proceed at an appreciable rate without it. The arrowhead is an open triangle pointing toward the action squiggle.

Catalyze forward/backward: this is directional catalysis. The triangle points in the direction that the noun catalyzes. This means that the verb does not act in the direction indicated without the noun, but, if it the action is reversible, it can act in the opposite direction.

Promote (illustrated in FIG. 9): The enzyme promotes the reaction. The reaction proceeds at a slower rate in the absence of the enzyme. This arrowhead is a circle.

Promote forward/backward: This is directional promotion. The circle is now tilted on the end of the line in the direction that the noun promotes. This means that the verb's rate is enhanced in this direction.

Inhibit (illustrated in FIG. 9): The enzyme prevents the reaction from taking place. The nib is a line parallel to the action that is inhibited, perpendicular to the line leading to the inhibiting noun. Inhibition may be a shorthand for an involved process, usually involving competitive binding of the enzyme. This doesn't matter at all.

Directional inhibition: In this case, the line is replaced by a T-shape with the large end facing in the opposite direction from the direction which is inhibited, See FIG. 9.

If the enzyme controls a binding, the arrowhead is pointed toward the filled circle that represents the bound state. This is because there is an implicit reaction squiggle inside the binding circle.

For completeness we list the special nibs which are used in the case of a binding. They are completely unnecessary in principle, since we could use the 2-1 reaction notation to replace the binding by a squiggle, for which the previously introduced nibs are adequate. But they are useful.

Catalyze binding: A double triangle, both pointing inward (see FIG. 10)

Catalyze unbinding: A double triangle pointing outward (see FIG. 10)

Catalyze both: Same as an ordinary catalyze nib. (See FIG. 10)

Promote binding: A pair of circles meeting at the center, with two outward pointing lines (see FIG. 10)

Promote unbinding: A line with two circles at the end (see FIG. 10).

Promote both: A circle. (See FIG. 10)

Inhibit binding: An I-shape. (See FIG. 10)

Inhibit unbinding: Two opposing T's (see FIG. 10)

Inhibit both: same as ordinary inhibition.

When a control line ends on a binding, all the different actions contained in the binding are controlled in the same way. Remember that a binding might contain several reactions, if there are several different ways the same dimer can form. All rules and special exceptions for binding may be done away with, because the binding notation is a module, and therefore is itself only a shorthand for a two-to-one reaction.

Because control lines are primitive, the precedence rules for likebox interpretation which characterized previous versions of this language are no longer necessary. This makes the language easier to present, but clearly doesn't change the meaning of the diagrams at all.

When a process is quite common, such as translation and transcription, it is convenient to introduce a shorthand for it. This introduces no new grammatical ambiguities. A formation process with the word "trans" inside (such as that depicted in FIG. 20) could represent the transcription of mRNA, the translocation of the mRNA to the endoplasmic reticulum, the excision of the introns, the translation of the protein, the folding of the protein, and the translocation of the folded protein to the appropriate destination. This is obviously just a slow verb, and it is provided only as an illustration of the fact that even very complicated biological process may be represented by simple diagrams. The transport of a protein from the cytosol to the nucleus in a eucaryotic cell is also a time-delay module and may be denoted by a "trans" labeled double-line squiggle as well. This is not a new element of the language.

Summary of the Language Introduced Thus Far In Abstract Form

It helps to make precise all the ideas that have been introduced in an exemplary embodiment. In this way, we both summarize the content of the previous section, and provide a formal definition of the abstractions that lie behind the diagram. This clarifies the parsing algorithm too.

Although the most immediate representation of the diagrams is in terms of pictures, we will specify the diagram without referring to the pictures, to ensure that the meaning of the concepts "verb", "noun", "likebox," "linkbox," "container," "action," and so on are entirely unambiguous. This section should be seen as a definition of these terms.

The diagram is composed of objects that are contained in other objects called containers, contain other objects that are called their contents, have references to other objects called members, and connect to other objects. All these concepts have been introduced before, but we recapitulate the definitions to make the language precise. The intent of this section is to provide a practitioner of the art of computer programming a method of implementing the diagram language which is very explicit.

We first define a container: an object is a container if the data of the objects it contains may be considered a part of its data. A linkbox is a container, as is the diagram as a whole. The diagram contains all the linkboxes inside it, while the linkboxes contain the atoms inside them, and the interior linkboxes inside. The analog of a container in the C programming language is the data-structure. If a data structure is defined in C, it can contain an integer, or a floating point value. If an instance of the data structure is stored in memory, all the data of the members is stored at this location. If the storage for that object is released or freed, then the data of this object is freed.

An object in the diagram can be contained in only one other object. An object can only be in one container at one time. This is why linkboxes cannot overlap. If they did, the objects in their intersection would be contained in two containers. This is forbidden.

An object can also refer to other objects. An object refers to another when it points to the other object abstractly. An example of object that refers is a likebox. The likebox doesn't contain the objects that are alike; it only tells the modeler that they are alike. If the likebox is deleted, the objects that are alike are not deleted. The distinction between referring to an object and containing and object is a standard idea of computer science. In the C programming language, a reference to an object is represented by a pointer, which is an abstract name for the object that is referenced. When you delete a pointer, the object is not deleted. Because likeboxes only refer to other objects, they don't contain them; they may have themselves as members. Unlike containers, there is no restriction on how objects can refer to one another.

The other way in which an object can interact with another is to be connected to it. A connection is like a mutual-reference. An object A is connected to an object B if A refers to B, B refers to A, and the references are mutual and cannot be created and destroyed separately. This is the standard way in which links in a graph are implemented in computer programs. It is just an abstract way of specifying the way in which objects in a diagram are tied together. In the language, nouns are connected to lines, and lines are connected to nouns. Similarly, lines are connected to verbs, and verbs are connected to lines.

A set of objects that give an unambiguous abstract meaning to the objects introduced thus far is the following:

Line: a line has two connections, one to a verb and one to a noun. The line also contains a resolution, which is a string described in the section on resolutions. It also tells you how it connects to the verb. The verb-connection-type can be one of: input, output, catalyze, catalyze-forward, catalyze-backward, inhibit, inhibit-forward, inhibit-backward. If the line is an input line, this corresponds to being connected to the input of a verb in the diagram. If the line is an output, it connects to the diagram as output. For every type of control-nib we have used, there is a corresponding line type, which abstractly represents that nib.

Noun: A noun has connections to lines. That's all it has.

Likebox: A likebox is a noun (it has connections to lines) but it also has a list of references to nouns inside it, called its members.

Interior Linkbox: An interior linkbox is a noun and it has a list of references to nouns inside it, called its members. It's like a likebox, but of a special type.

Typed noun: A typed noun is a noun with a number-type, one of unique, common, or ubique.

Atom: an atom is just a typed noun and nothing else.

Compartment: a compartment is an atom which is also a container.

Linkbox: a linkbox is an atom which is a container and it may only contain unique atoms.

Verb: A verb has connections to lines. That's all it has.

Verbbox: a verbbox is a verb (it has connections to lines) but it also contains a list of verb members.

Action: an action is a verb with an additional speed: fast, regular, slow, and it might be reversible or irreversible.

Equivalence: an equivalence is a verb with exactly one outgoing and one incoming line, and no control lines.

Module: A module is a container for other objects.

The preceding words say precisely how the objects may link together, but we must also say what statements in the language are absurd. We do this below. Most of the rules are obvious from the meaning attached to the concepts, but in order to implement a method in a computer, we often need to state the obvious.

Parenting: An object cannot contain the container that contains it, or the container that contains the container that contains it, etc. This is obvious, but it should be said. It is impossible to draw a diagram that violates this rule, at least, on an ordinary flat sheet of paper, because the containers nest inside each other.

Line: A line contained in a container can only connect a noun and a verb in that container or a subcontainer. This is also obvious in a drawn diagram, because if the line is inside a closed shape it can't go outside to hook up to lines and verbs outside that shape. Therefore it must link up things inside the container it is contained in, or inside subcontainers of that container.

Equivalence: Equivalences may not be joined to lines that are attached to two likeboxes in different containers. This is not an obvious rule, but it is just used to give a restricted domain in which parsing of the language is easier. The next rule is one of the obvious ones. An equivalence line cannot link together a container with one of its elements, or a subelement of a subelement, and so on. This is logically clear, but it must be said. An object cannot contain itself, nor can it contain itself in a sub-container, and this means that it cannot be equivalent to one of the things it contains. Likeboxes that have containers as members, or as members of sub-likeboxes, or as members of sub-sub-likeboxes cannot have an equivalence line to any of the contents of those containers, for the same reason.

Interior Linkbox: An interior linkbox must have a linkbox for a parent, and it can only contain atoms contained inside the linkbox. It may not contain likeboxes or linkboxes, since a linkbox doesn't contain any of those things.

This is a complete description of the abstractions of the language introduced in the preceding sections. It makes explicit what the diagram is corresponding to a given drawing. We will give some more examples now of drawing that use the elements we have introduced. These are examples only, and they may be omitted without loss of content. We include them only to make the presentation clearer.

Drawings Abstracted and Their Corresponding Diagrams Described

We begin by abstracting all our figures. FIG. 1 is in the Kohn notation, but this is subsumed as a trivial case of the language using the binding dot module. We may therefore make an abstract representation of this diagram just as if it were written in the language presented here. Because it is in the Kohn notation, it is very complicated.

The fact that this language is capable of subsuming simpler earlier languages should not be interpreted as a statement that the language is an extension of these earlier methods. It is both independently defined, independently developed, and defines its primitives completely differently. It is simply an indication that the language is powerful enough to be able to define modules that make it backward-compatible with old notations.

In the C programming language, we may analogously use the macro definitions #define BEGIN (and #define END) to make the language look like earlier more primitive languages. This is not an indication that C is based on those earlier more primitive languages, but an indication that C has a flexible enough structure to include them.

The abstract representation of FIG. 1, interpreted as a simple diagram in the Cell Language has four common atoms A, B, C, D, and seven anonymous binding modules. There are seven atoms and seven actions hidden in the binding modules when we interpret this diagram, which are anonymous. In order to refer to them, we give them a name. The seven names for the seven atoms we choose to be AB, AC, AD, ABC, ABD, ACD, and ABCD. The binding which contains AB is represented by the dot labeled 2. The binding which contains AC is represented by the dot labeled 4. The binding which contains AD is represented by the dot labeled 6. The dot labeled 1 contains the atom ABD. The dot labeled 3 contains the atom ABC; the dot labeled 5 contains the atom ACD. The dot labeled 7 contains the atom ABCD. We also have to name the seven reversible reactions hidden inside the binding dots, and we call them ~AB, ~AC, ~AD, ~ABC, ~ABD, ~ACD, and ~ABCD. These are the reactions hidden inside the dot with the atom with the corresponding name.

Each of the seven atoms in the binding modules is connected to the verb as an output. The atom AB is connected to a line which is connected to the action ~AB as an output. The atom BC is connected to a line which is connected to the verb ~BC as an output, and so on. The atom A is connected to three lines, which are inputs to the actions ~AB, ~AC, ~AD. The atom B is connected to four lines which are inputs to ~AB, ~ABC, ~ABD, ~ABCD. The atom C is connected to four lines which are inputs to ~AC, ~ABC, ~ACD, ~ABCD. The atom D is connected to four lines which are inputs to ~AD, ~ABD, ~ACD, ~ABCD. There are 21 lines in all, three for each binding. As promised, the bindings turn into an action and an atom in this language.

This is the abstract structure of the graph of FIG. 1. It is a one-to-one translation of every element of the diagram to an abstract structure. We didn't need to parse to make the translation. FIG. 1 is ridiculously complicated because it doesn't use any of the grammar defined in the language. The equivalent diagram to FIG. 6 is the next figure we represent abstractly, because the interpretation of FIG. 1 and FIG. 6 is the same. FIG. 6 has a grammatical element, however, it contains a linkbox. The linkbox is named A. Inside the linkbox called A are six anonymous unique atoms. We will give a name to the atoms represented by the three open circles BS, BB, CS, from left to right, which stand for B's binding site, C's binding site and D's binding site, and the other three atoms in the linkbox are inside the binding dot and are called CB, DB, DB, which stand for B bound, C bound and D bound. There are three actions in the bindings of the linkbox which we will call ~BBind, ~CBind, and ~DBind. The abstract structure of the diagram is simple. There is one linkbox, A, containing six unique atoms and three actions. The first action, ~BBind is connected to an input line which is also connected to BS. It is connected to a second input line which is connected to B. It is connected to an output line which is connected to BB. The second action ~CBind is connected to an input line which is also connected to CS. It is also connected to a second input line which is connected to C. It is connected to an output line which is connected to CB. Finally, the third action, DBind is connected to three lines as well. The two inputs are connected to D and DS, and the output is connected to DB. This is the abstract structure of the diagram.

The above might seem tedious and obvious, but it is essential to be precise when specifying abstract structures, because there are many ways to abstract a given drawing. It is important for an implementation that the specification be precise so that different implementers will not produce radically different implementations. Every time we draw a diagram, such a tedious description is implicit in the drawing, in the pattern of connections of the lines.

FIG. 2 is very simple: The portion labeled unique atoms corresponds to an abstract diagram with two unique atoms named X and Y, the portion labeled common atoms corresponds to an abstract diagram consists of two common atoms X and Y, while the abstract diagram corresponding to the portion labeled ubique atoms consists of two ubique atoms X and C.

FIG. 3 is simple too. The abstract structure of the part labeled action consists of two unique atoms named E and B, three common atoms called A, D, and C, and one reversible reaction. A, B and C are connected to lines that connect to the reaction, whether at the input or the output is unspecified because the action is reversible. We will make the choice that in the abstract diagram A, B and C connect to lines that input to the reaction, while D and E connect to lines that connect to the output of the reaction. The part labeled irreversible action has five common atoms named A, B, C, D, and E and one irreversible reaction. A and B are connected to lines that input to the reaction, C and D connect to lines that output to the reaction, while E connects to a line that indicates that it catalyzes the reaction. The part labeled fast action has four common atoms A, B, C, and D, one ubique atom F, and one fast action. A and B connect to lines that connect to the input of the fast action, C and D connect to lines that connect to outputs of the fast action, and F connects to a line that connects as an inhibition control to the fast action. The part of the Figure labeled slow irreversible action contains three common atoms A, B and C, and one slow irreversible action. A and B connect to lines which connect to the input of the action, while C connects to a line that connects to the output. This is true abstractly, even though there is no line that C connects to in the actual drawing. The reason is that every noun can connect only to lines, not to verbs directly. The remaining parts of the diagram are trivial.

FIG. 4 contains equivalent forms for a diagram with a binding dot. In the first form, we have three atoms, one named A, one named B, and one anonymous and one action which is anonymous. The action connects to two input lines. One of the lines connects to the A and the second connects to B as inputs. The action has one output line which connects to the atom representing the bound state of A and B. The abstraction of the diagram is the same whichever of the two forms are used to produce it, except that when the binding is absent, the anonymous action and the anonymous atom are not contained in the binding for the simple reason that the binding is no longer there. The figure illustrates that binding is not primitive in the language, and that the binding dot can be reduced. It also gives the number-type of the hidden atom inside the binding for various combinations of number-types of objects.

FIG. 5 has an abstract representation with equivalence lines. The left side has There are six atoms in the abstract representation, A, B, AB, ABAB, and two anonymous atoms. The atom AB is connected to a line which is connected to an equivalence line as input (although it could be output—equivalence lines have no direction), which is connected to another line as output which is connected to the anonymous atoms contained in the binding that is on the line joining A to B. We call this anonymous atom AB2, so that we may refer to it. AB2 is connected to two lines, which come in as input to the anonymous reaction contained in the binding represented by the other dot in the diagram. We shall call the noun in that second binding ABAB2. It is connected to a line which is connected to an equivalence line, which is connected to the common atom ABAB. In the second presentation of the figure, the lines that come into the reaction which produces ABAB2 start at AB, rather than AB2.

FIG. 7 has one anonymous linkbox containing 8 anonymous uniques. They are uniques because all the members of a linkbox are unique, a fact which is discuss in great detail in the next section. Four of the atoms are buried inside binding dots. There are four reactions also buried in the dots, and one ubique in the diagram in addition to the linkbox. The atoms connect to the lines and the reactions in a way that should by now be obvious. The new structure is an interior linkbox which contains references to two of the atoms in the linkbox.

Figure 8:
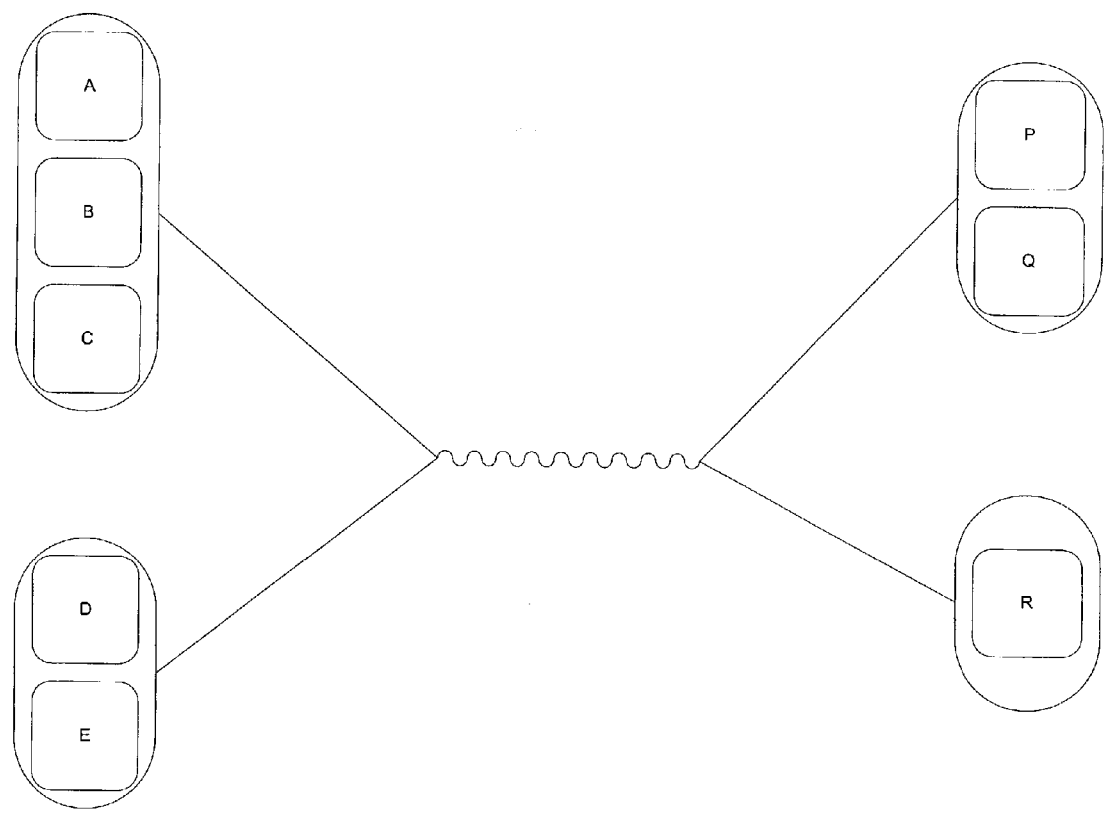
FIG. 8 depicts the symbology for the likebox.

FIG. 8 is an example of likeboxes. There are four anonymous likeboxes present, one of which has references to three common atoms which are its members A, B and C, another contains two common atoms as members D and E, another contains two common members P and Q, and the last contains one common member R. The likebox with members A, B, C and the likebox with members D and E appear as input (or output—the action is reversible!) to a reaction and the other two likeboxes are outputs. When we say nouns are connecting to lines as inputs or outputs, we of course mean that they connect to lines with no resolution which connect to the verb as input.

Figure 9:
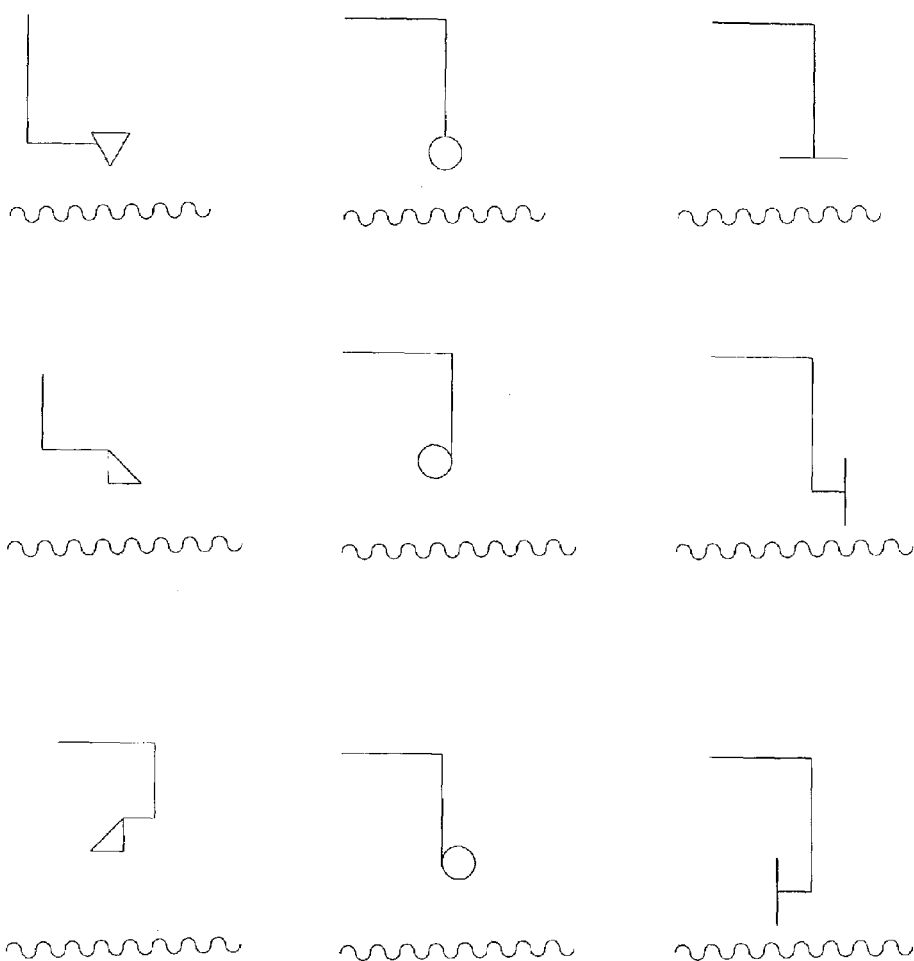
FIG. 9 illustrates the nib shapes used for control lines.

FIG. 9 is not a grammatical diagram since it has lines that do not end on nouns. It is designed to illustrate the different nibs that can indicate different types of control lines.

FIG. 10 is not a grammatical diagram since it has lines that do not end on nouns. It is designed to show the special nibs associated with the binding shorthand.

FIG. 11 contains one likebox with three common atoms as members called A B and C. The likebox is attached to three lines, one with resolution 0, one with resolution 1 and the third with resolution 2. The diagram is not grammatical, because the lines do not attach to verbs.

Figure 12:
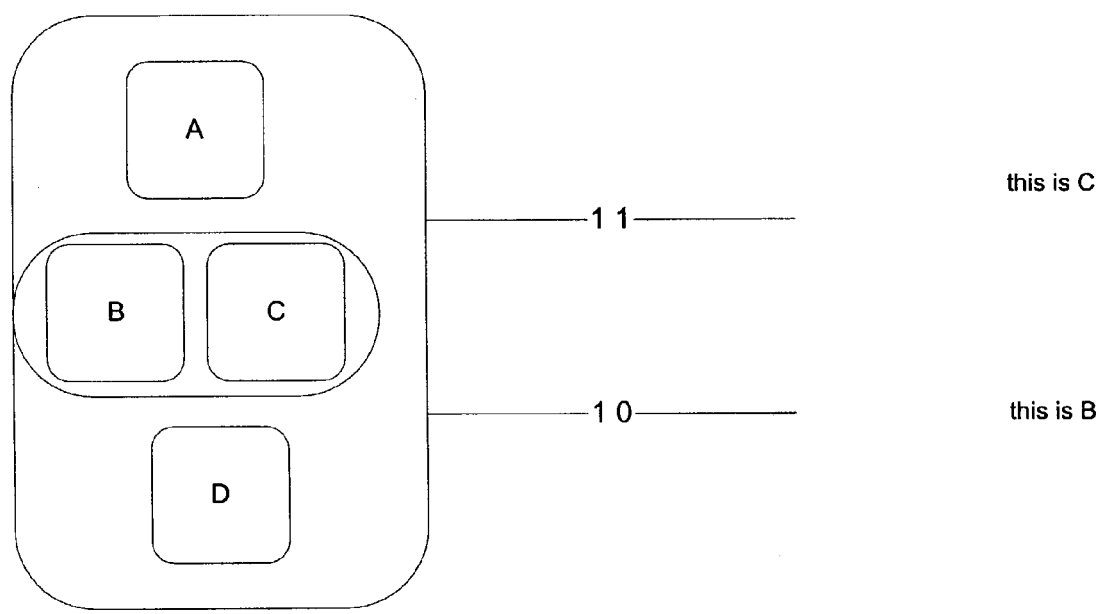
FIG. 12 shows an example of the numbering of nested likeboxes

FIG. 12 is not grammatical either. It depicts one likebox with four common atoms as members it refers to A, B, C and D. A, B, C and D, just to be clear, are contained in the diagram, not the likebox. Likeboxes don't contain objects, they refer to them. The likebox attaches to two lines, one with resolution 1 1 and the other with resolution 1 0.

Figure 13:
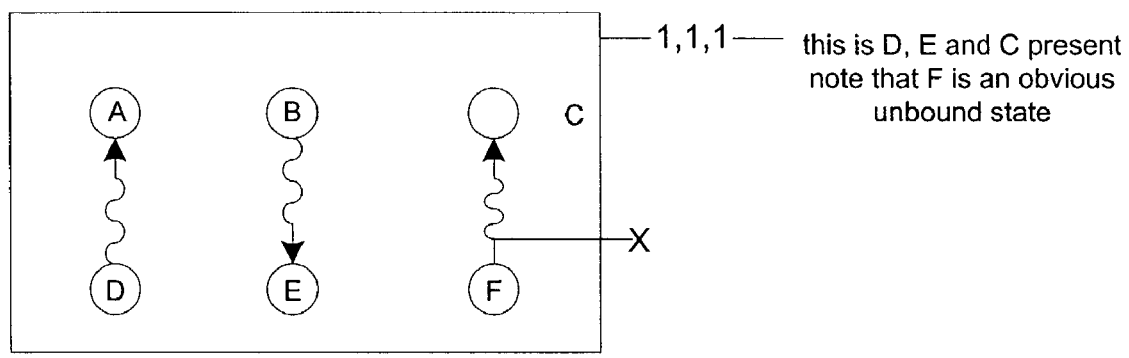
FIG. 13 shows an example linkbox numbering

FIG. 13 is not grammatical either, because it has a hanging line that does not connect to a verb. It consists of a linkbox containing (not just referring to but containing) six unique atoms A, B, C, D, E, F (even though they look like common atoms—the contents of a linkbox are always unique!) and one ubique atom named X contained in the diagram, not contained in the linkbox. The linkbox also contains three irreversible reactions. One reaction connects to A as output and D as input, one connects to B as output and E and input, and one connects to C as output and F and X as inputs. The line connected to the linkbox has resolution 1,1,1 and it doesn't connect to any verb, rendering the whole diagram ungrammatical.

Figure 14:
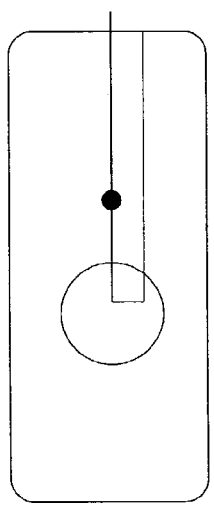
FIG. 14 shows an example of recursive diagrams
Figure 14:
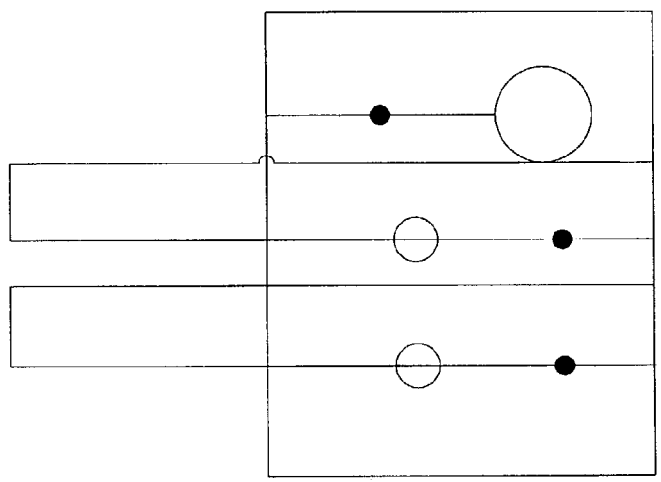

FIG. 14 contains an anonymous likebox referring to two member atoms, both common. There is one action in the diagram which takes the likebox and one of the atoms as input, and produces the other atom as output. That action is hidden inside the binding dot. There is a second anonymous linkbox with six anonymous unique atoms: three represented by open circles, three buried inside binding dots. The three actions in the three binding dots are connected to the linkbox on one side and to a unique atom inside on the other. Two of the lines are owned by the diagram (remember that lines are objects, and so may be contained!) the remaining six (remember that there is a line inside the binding dot too—connecting the binding to the bound state) are in the linkbox.

Figure 15:
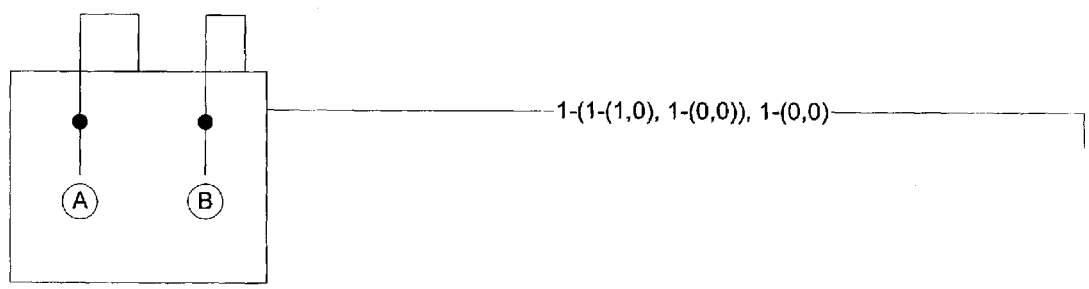
FIG. 15 shows an example of recursive historical resolution

FIG. 15 corresponds to an abstract diagram which consists of one linkbox with four unique atoms and two reactions (and four lines—three more lines are contained in the diagram, not the linkbox. Remember that two lines are buried in the binding dot). There is one line leaving the linkbox with resolution 1-(1-(1-0), 1-(0,0)), 1-(0,0) which doesn't end on a verb and renders the whole diagram ungrammatical.

Figure 16:
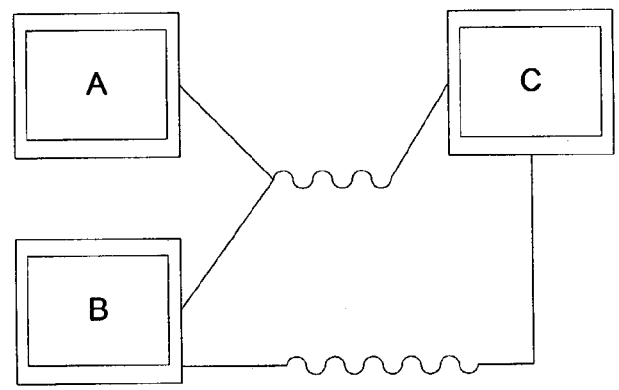
FIG. 16 shows how a linkbox inherits the numbering of its likeboxes.

FIG. 16 is a diagram which is illegal, because it has an action which takes two uniques to one unique. This is discussed further in the implicit likebox section.

Figure 17:
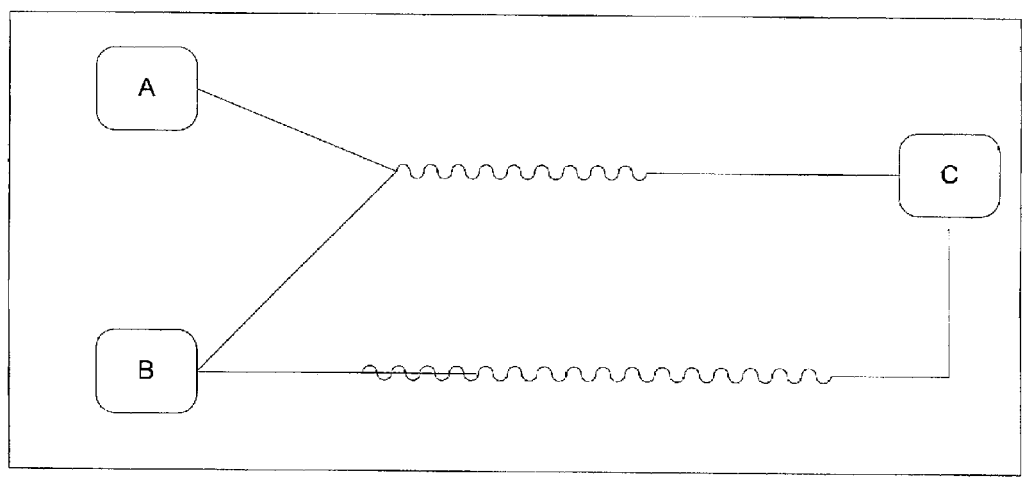
FIG. 17 illustrates a recursive resolution of a likebox and the accompanying notation.

FIG. 17 is illegal for the same reason (the contents of linkboxes are unique).

Figure 18:
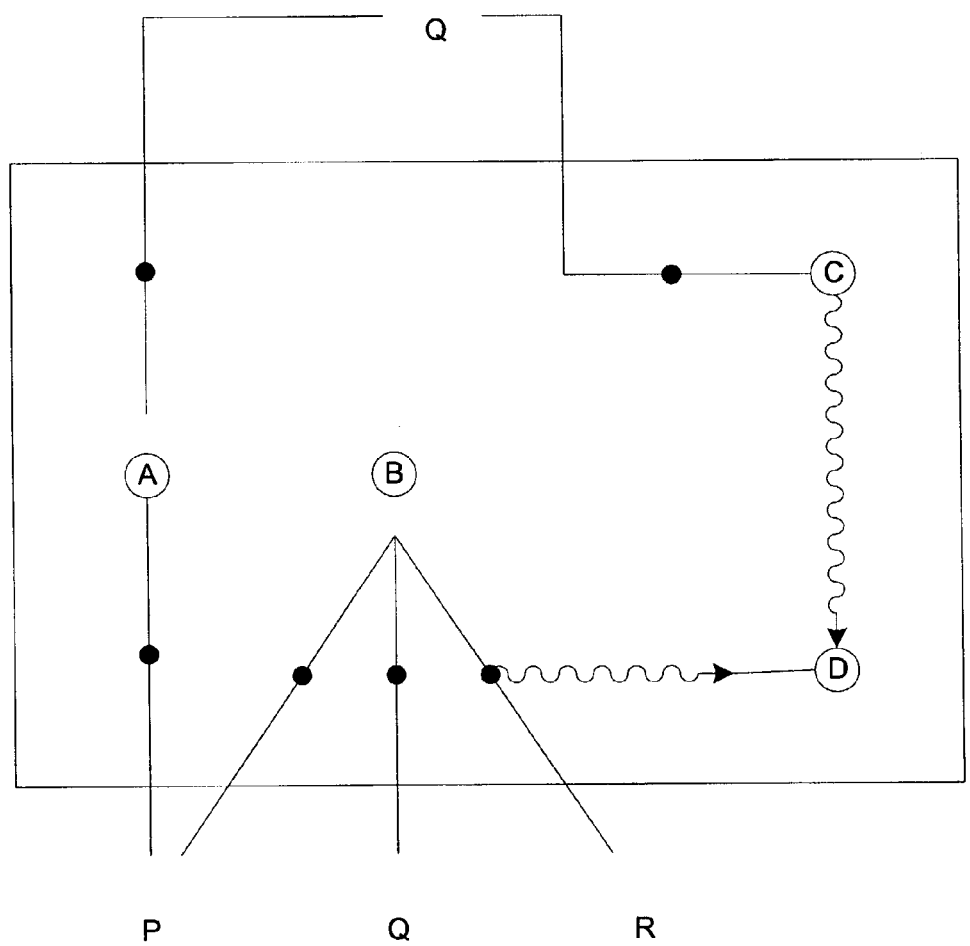
FIG. 18 shows a recursive resolution of a linkbox and the accompanying notation.

FIG. 18 consists of one linkbox with 10 unique atoms, four of them named A, B, C, and D, the rest anonymous. There are 8 reactions in the diagram, all contained in the linkbox, two of which are irreversible, the rest reversible (they are hidden in the binding dots). There are also three ubique atoms outside the linkbox P, Q and R, which connect to actions hidden in the binding dots.

Implicit Likeboxes

A linkbox can contain several instances of its components. If the linkbox represents a protein like p53, with multiple phosphorylation sites, or a stretch of DNA with several promoter binding sites, there is an exponentially large number of states of the same molecule. One of the simplifications introduced by the language is that a linkbox can contain more than one form of one of its components, see FIGS. 13 and 18. If a site can be phosphorylated, the phosphorylated form may be placed inside the linkbox. The proper interpretation is that the linkbox contains a likebox of the two phosphorylation states, in addition to other binding sites.

This requires some explanation. A linkbox cannot contain a likebox, after all. The likebox is implicit—which means that it must not be drawn. It is present as a new abstract structure—an implicit likebox. The implicit likeboxes are there whenever we have a linkbox. If an action takes place with one input and one output inside a linkbox, the input and the output are in the same implicit likebox.

The concept of implicit likeboxes defines the state of a linkbox. This is what it is used for, and it is all that it is used for. Although it might seem at first sight that implicit likeboxes are used to reduce the complexity of many diagrams, because when bindings occur in several different ways, the result is a forest of possibilities, this is not the case. It might also appear that the implicit likebox allows a modeler to annotate many paths with one process line. This is not true either. The effect of implicit likeboxes is not at all to prune the forest of possibilities which has complicated previous notational efforts. That is done using plain old explicit likeboxes and explicit linkboxes.

If the linkbox participates in a reaction, all the different possibilities for the implicit likeboxes participate in the same reaction. If a sub-linkbox contains components of an implicit likebox, there is an implicit sub-likebox associated with the linkbox. The linkbox inherits the numbering of its likeboxes, separated by a comma, as shown in FIG. 11. Numbering is a way of identifying the state of a linkbox, and it will be described in detail in a later section.

Sometimes we wish to separate out single instances of a likebox for special treatment. Perhaps one of many like enzymes has a different effect on a particular reaction. Perhaps the different phosphorylation states of a complex protein do very different things. In order to allow this, we introduce a numbering scheme to identify the different components of a likebox. Each component is given a number, either explicitly, by placing a number next to it, or implicitly from left to right and top to bottom with the numbers increasing in the same order as an English reader reads. With a nod to computer science, all counting begins at zero. There is one exception to this rule if the likebox is implicit, and one of the cases is known to be the unbound state of a binding site, this site is numbered zero by default. When a line emerges from the likebox, if the line has a number attached, then the line refers only to the case indicated. If the line forks into two lines and a number is attached to one of the lines, the numbered line refers to its case, and the unnumbered line refers to all the others.

A likebox can contain other likeboxes, in which case certain numbers refer to likeboxes. When this happens, the inner likebox is unresolved. If the modeler wishes to resolve the inner likebox, the resolution of the interior likebox should appear immediately after the number that indicates the likebox separated by a space and enclosed in (optional) parentheses, as illustrated in one embodiment in FIG. 12. This is a recursive definition, since likeboxes can nest arbitrarily deeply.

A linkbox inherits the numbering of the implicit likeboxes it contains. To resolve a linkbox, the likebox resolutions are listed, separated by a comma, as shown in FIG. 13.

When two resolvable objects participate in an action, the resulting output may be different depending on which instances participate. In order to resolve the ambiguity, the output inherits the resolution of all the resolvable participants into a comma separated list in English language order. If there are several actions that produce the same object, they are lettered A, B, C, for example, either explicitly or implicitly in English language order. If there are more than 26 possible actions, we extend the notation: after Z comes AA, then AB, etc. To resolve a node, proceed backwards through its history. First, write down the letter of the reaction that produced the node, and then write the resolution of the likeboxes in a comma separated list. If there is a linkbox as one of the reactants, write down the resolution of the linkbox in parentheses as one of the elements of the list.

Recapitulation of the Language Features Introduced in the Previous Section

Because the previous sections have introduced a lot of new ideas, it is nice to recapitulate them, and give precise definitions to all the ideas. There are many new ideas, so we present them one by one.

Implicit likeboxes are defined by the actions that take place among the components of a linkbox. The precise definition is: when two states of a linkbox appear as input and output of an action, they are considered two states of the same object. That object is the implicit likebox, which is a collection of all the its states. This is a general rule, but it requires that every action which has an input inside a linkbox have an output in the same linkbox. We demand that this is so.

It is very easy to generalize the concept of implicit likeboxes to cases where a unique atom is produced or destroyed, so that there is no unique on the other side of the action, and the implicit likebox rule is violated. This is done by supposing that when this happens a special "null unique" is being destroyed or produced at the same time. This is a shorthand which allows the some uniques to be implicit. We do not allow this in the version of the language in the present disclosure, because it makes the presentation less clear, but some implementations of the language may have this feature. We now formulate the implicit likebox rule as it applies to this disclosure.

Implicit Likebox Rule (Linkbox form): Every time an action has an input a state in a linkbox, it must have an output in the same linkbox. Every time an action has an output state in a linkbox is must have an input state in the linkbox.

The elements of linkboxes now fall into clumps by this rule. Two elements of the linkbox are defined in the same clump if there is a verb which has one as output and one as input. The clumps are the implicit likeboxes. Notice that it is very important that all the actions have one output and one input in a linkbox.

There is a simple generalization of the linkbox rule to any compartment. It is required logically by the concept of a unique noun. The rule is the general implicit likebox rule Implicit Likebox Rule (General Form): Every time an action has an input which is unique and contained in container A, it has an output which is a unique in container A. Likewise, if an action has an output which is a unique in container A, it must have exactly one input which is unique in container A.

The uniques in containers are split into implicit likeboxes just like the contents of a linkbox. As a matter of fact, a little thought will convince the reader that the only difference between a linkbox and a general compartment is that every atom in a linkbox is unique. And this is the definition of compartments and linkboxes.

A compartment is a container which is a noun, unique common or ubique and attached to lines. This is a noun that contains other nouns.

A linkbox can now be identified as a special case of a compartment which contains only unique atoms. This is a simplification of the language, and unifies the concept of compartment and linkbox. The unification allows us to define all the algorithms in a way that doesn't mention linkboxes explicitly, but only refers to them through compartments.

Since the preceding discussion is abstract, we will give an example of identifying and using implicit likeboxes. The first example is shown in FIG. 18. In this linkbox, there are only two implicit likeboxes. The first is the three atoms defined by A and the two bound states, one to the external ubique P and one to the external ubique Q. The second is define by B, C, D, the three bound states of B with P, Q and R, and the one bound state of C with Q. The first of the two implicit likeboxes is the one containing C, D, and B. The second implicit likeboxes is the one with A. This is because A, C, D, and B are all obvious unbound states, since the bound states are the only obviously bound states in the linkbox. Recall that a state is obviously bound when it only appears alone as input to verbs. The obviously unbound states are numbered first, and C is the zeroth element of the implicit likebox containing B, C, and D. The implicit likebox that contains A has A as zeroth element, and A comes after C in reading order, since C is above A. This means that in the rather arbitrary method of numbering and ordering we have chosen to use in this embodiment, the implicit likebox containing C, D, and B is first, and the implicit likebox containing A is second. There are three states in the implicit likebox containing A and seven states of the implicit likebox containing B, C, and D.

The state of the linkbox in FIG. 18 may be described are described by the resolutions "0,0" meaning C and A are in the linkbox, "0,1" meaning C plus A bound to Q are in the linkbox, "0,2" meaning C plus A bound to P, "1,0", "1,1", and "1,2" meaning B plus A, B plus A bound to Q and B plus A bound to P. "2,0", "2,1" and "2,2" meaning D and the three possibilities for A's implicit likebox. "3,0" "3,1" and "3,2", meaning C bound to Q and the three possibilities for A's implicit likebox, "4,0", "4,1" and "4,2" meaning B bound to P and the three possibilities for A's implicit likebox. "5,0", "5,1" and "5,2" which means B bound to Q and the three possibilities for A's implicit likebox, and the three final states "6,0", "6,1", and "6,2" which refer to B bound to R in the linkbox and the three possibilities for A's implicit likebox.

FIG. 16 shows that the implicit likebox rule is necessary so that unique atoms stay unique. This diagram shows unique atoms A, B and C, with a reaction that takes B to C reversibly, and a second reaction that takes A and B to C reversibly. This reaction violates the implicit likebox rule, because there is a reaction with two input uniques (A and B) and only one output unique C.

Imagine starting a model with C present. C is a unique, and we know that this means it may be present or absent. Let us now imagine the reaction depicted on top running from left to right, and destroying C. The result is A and B. Now imagine the bottom reaction taking B to C. Now we have A and C in the model. Finally, let us take C and run it through the top reaction again. The result is another copy of A and a copy of B.

But we have two copies of A now, one left over from before, and a new one just produced, and A was supposed to be unique! How can this be? This is a paradox.

The reason we encountered a paradox is that the implicit likebox rule was violated. If we had used reactions that obey the implicit likebox rule, we can't run into a paradox, because if there is at most one unique atom from each implicit likebox, it may only transform into other unique atoms in that same likebox.

FIG. 17 shows the same diagram as FIG. 16, but now the unique objects are in a linkbox. Again, this diagram is forbidden by the rules, because the atoms in the linkbox are unique. Generalizing the implicit likebox rules from linkboxes simplifies the description of the language.

FIG. 6 shows a diagram with the binding shorthand notation. We again may identify implicit likeboxes, but we must remember that binding is a shorthand that contains a reaction inside. This means that the bound state is in the same implicit likebox as the unbound state because they are joined by a reaction. This is very useful, because it allows us to enumerate the states of a linkbox which represents a complicated molecule with many binding sites. This one is relatively simple. It has three binding sites connecting to A, B and C. Each binding site has two states, represented by the open circle and filled dot. There are eight states of the linkbox as a whole, corresponding to all the possible ways A, B and C can bind.

The implicit likeboxes may be identified by noticing which atoms are linked to which others by verbs—the open and filled circles are each in one implicit likebox, since the action of binding links them.

The number of states that this linkbox may be in is 8, the product of the two states of each implicit likebox.

The states of FIG. 6 are numbered (0,0,0), (0,0,1), (0,1,0), (0,1,1), (1,0,0), (1,0,1), (1,1,0), and (1,1,1). These are the eight different resolutions that the linkbox of FIG. 6 can have. The same is true of the linkbox of FIG. 13, and there the implicit likeboxes are more explicit. Note that the numbering on the third implicit likebox has an obviously unbound state, and so its numbering is the reverse of the usual order.

Historical resolution is the specification of objects by their past—the manner in which they were formed. The method of historical resolution is used in FIG. 15 to specify one of the states of a recursive diagram. The resolution in FIG. 15 is 1-(1-(1,0), 1-(0,0)), 1-(0,0). The string is interpreted as follows: state 1 of the first implicit likebox (the bound state) which was formed from an object (the linkbox) in the state (1-(1,0), 1-(0,0)), and the second implicit likebox is in the state 1. The resolution has been simplified, but it must be examined again, now that it has been reduced some. The state (1-(1,0), 1-(0,0)) states that the linkbox has its first implicit likebox in the state 1, and its second in the state 1. The state 1 in the first implicit likebox was formed from the binding to a linkbox in the state (1,0), while the second state 1 was formed from a binding to a linkbox in the state (0,0). This completes the resolution of the linkbox. Notice that it describes the state of the linkbox by its past.

Historical resolution is important for the meaning of the objects, although the efficient parsing algorithms cannot parse them in general. The bound state of A and B can be different physically, depending on which of the different objects bind.

The full notation for resolution is clarified by the following recursive rules:

To talk about a member of a likebox, we use the number of the member.

To talk about the resolution of a member of a likebox, we use the number of the member followed by a space, followed by the resolution of the member. One example is a likebox with two atoms, A and B. The resolution on the line from the likebox is 1-(1,0)+(0,1,1). It talks about B, since it starts with 1, but it goes on to talk about the special case of a B which was formed from the (1,0) state of L1 and the (0,1,1) state of L2.

We resolve the state of a linkbox by a list of numbers, one for each implicit likebox, as described before. One example, the resolution 0,1,2 refers to the state where A is present (meaning the binding of A to P hasn't happened), B bound to Q is present, and C bound to S is present. The state of the linkbox is then (optionally) followed by a hyphen and the history of the linkbox, a description of how it was formed.

We describe the history of an atom by a hyphen, followed by an optional letter identifying the reaction followed by another hyphen followed by the resolution of any historical reactants, if any.

Complex Examples: Recursion and General Computation

The language opens the door to dangerous recursion, since the resolution of the history of the object might come back to referring to the same object once again. The clearest example of this is the process of polymerization, since a polymer may join a linkbox of monomers to form the polymer once more. In principle, infinite length histories may occur, depending on how the monomers were joined and/or removed.

The polymer diagrams of FIGS. 14 and 15 provide interesting examples of recursive diagrams and show how the diagrams allow for recursive resolution. The first diagram shows a likebox of two atoms. The first atom is A, which is a common, and the second is hidden inside the binding dot, and it represents the bound state of A with the likebox. The monomer molecule has a binding site, which may bind the molecule itself, whether or not there are monomers already bound. Applying the resolution operators, it is very easy to trace back the history and refer to a particular length of polymer.

A more complicated example is a branch polymer diagram such as in FIG. 15. In this case, there are two separate sites which may bind the molecule as a whole, in either bound or unbound form. In this case, the recursive resolution resolves the branched polymer structure.

The recursive properties of certain biological molecules and their computational structure can therefore be represented by the language.

Parsing the Language: Optimized and Simple Parsing

The goal of this section is to describe two parsing algorithms for the language. One algorithm is designed to be maximally efficient, the second to be maximally comprehensible. There is a trade off between efficiency and simplicity, so the efficient algorithm is complicated, but generates good models, while the simple method is simple but generates bad models. The efficient method produces a list of nouns and verbs which are primitive from a diagram. This algorithm doesn't produce an interpretation of every conceivable diagram, but it does produce an efficient parsing of many diagrams. It will be illustrated on some examples which will show its domain of applicability. The algorithm is only explainable in steps. It is a good idea to review the language before reading the algorithm, and to be especially familiar with the definition of implicit likeboxes.

Parsing Algorithm with No Likeboxes, Linkboxes, Verbboxes Compartments, Fast Actions, Slow Actions or Resolutions: Using the Implicit Likebox Algorithm Part I First, we describe the parsing of a diagram in a reduced form, i.e., in which the only symbols in the diagram are atoms and reactions. This is technically not necessary for understanding the parsing of the grammar of the language, but it does describe how to produce a good model of an interaction network from the language.

No likeboxes or linkboxes appear. In this form, the translation to a model is immediate because the language is crippled and becomes a notation. The common and ubique atoms are assigned a name. Wherever an equivalence line appears, one of the two names is removed, and the single name is now shared by both atoms. The names representing common atoms are then assigned an integer value, the number of copies, while the names representing ubiques are assigned floating point values which represent their average number, or concentrations, depending on the system. Why this is an optimization will become obvious when the more obvious method of parsing (which works for any diagram, but produces an inefficient model) is introduced. This section describes the implementation of a model of chemical transformations in a way that is rather standard in the chemistry and modeling literature. It gives an interpretation for a grammarless form of the language.

The uniques are clustered by the implicit likebox algorithm. We redefine the algorithm here: We ignore all the actions that do not connect to lines connected to a unique. The reduced reactions must have the following property: each unique must only participate in actions with one unique descendant. The uniques therefore fall into equivalence classes, according to whether or not they are linked by a chain of reactions. The equivalence classes are called the implicit likeboxes. The implicit likebox algorithm is the method of identifying the implicit likeboxes. Once these are identified, each unique atom acquires a number in the equivalence class, which is the position of the atom in the implicit likebox. We can refer to every unique by its equivalence class and its number within it, as these terms are defined in mathematics.

The state of the cell is now specified by an integer for each implicit likebox, specifying the state of the implicit likebox, a variable integer for each common atom called a copy number, and a real number value for each ubique atom, called a concentration. The ubiques' concentrations are real number parameters that can be varied to define the model.

They may be represented as floating point numbers on a general purpose computer. They do not necessarily correspond to number divided by volume. We will use the word concentration nonetheless for their value.

Each reaction is now identified with a function of the copy-numbers of its common atoms and the concentration of its ubique atoms, which defines a rate for the reaction. In the simplest models, all the rate functions are linearly proportional to the concentrations that are incoming to the reactions, but any function may be specified in a general interpretation of the language. We will define one of the simplest interpretations explicitly so that an implementation is explicit. In this case, the function associated with each action is multilinear in the input copy-number.

With each irreversible action, which is a reaction, since we exclude slow and fast actions in this section, we associate the algorithm which computes the product of the input variables and a function of the controls, and calls it the forward rate. If there are any atoms acting as controls, we compute the forward rate according to this (more or less arbitrarily chosen but consistent with intuition) function:

$$f = CI$$

where $C=E(k1+P)/(k2+I+P+E)$, E is a weighted sum of all the copy-numbers or concentrations of all the atoms that catalyze the action, I is the weighted sum of all the inhibiting atoms copy-number or concentration, and P is the copy-number or concentration of all the atoms that promote the reaction. Symbols k1 and k2 are constants for the reaction, as are the weights in the weighted sum. Those must be added to the verb before we can produce a model. In this interpretation, we must adjoin at least two numbers to every verb to produce a model. This is true for every interpretation, and generally other interpretations require more data than that. We assume that this has been done by some method. There are many well known methods for writing down numbers. It is not done in the diagram because it is well known, and because the numbers depend in a detailed way on the interpretation. For purposes of full disclosure, we will now make a useless and arbitrary choice of one way to do this: list k1 and k2 next to each action, then the weights (real numbers) for the weighted sum of the inhibiting lines, if any, then the weights for the promoting lines, then the weights for the catalyzing lines. Voila! fully specified reactions with all the constants.

The copy number of a unique is defined to be one if the unique is present, that is if the model is in the appropriate state of the appropriate implicit likebox, and zero otherwise. This allows uniques to be controls to actions.

For every reversible action, we compute two rates, one forward and one backward. The backward rate is calculated using the copy-number or concentration of the outputs as if they were inputs. Reversible reactions require two sets of parameters, one for the forward rate, and one for the backward rate. If we must produce an arbitrary way to specify these numbers, we say, write all the forward constants first, then all the backward constants.

The forward rate tells us how fast the inputs turn into outputs, the backward rate how fast the outputs turn into inputs. We subtract them to find out the total rate at which inputs turn to outputs.

The model is now defined thus: for every reaction which doesn't have uniques on either end, figure out the total rate at which the inputs become outputs. Multiply this by a global constant number called "epsilon"; this is the rate at which time ticks. Then generate a Poisson distributed random variable with mean equal to the number that you got.

Subtract that number from the copy-number of every common atom that is an input; add it to every common atom that is an output.

If the reaction involves a unique as input and output, check the state of the implicit likeboxes to see if the unique on either side is present. If the unique on the input side is present, calculate the forward rate. Then multiply by epsilon. Then generate a Poisson random variable with that mean. If that variable is not zero, change the state of the implicit likebox to make the input unique vanish and the output unique appear. At the same time, add the nonzero number to the copy-number of all the common outputs, and subtract it from the copy number of all the common inputs. This is a way of saying that the action happened that many times during this step of modeling.

The preceding is not a particularly insightful method of generating a model; it is simply one way of many. The core of our optimized parsing method is the reduction algorithms that produce a diagram which may be parsed in this way, even when grammatical objects are present. This part of the algorithm is more or less unique, and it defines the grammar of the language precisely. The algorithm is more of less unique because it is a consequence of the intuitive definition of the language objects in the discussion of the previous sections. It is a bit complicated to present because the language is not at all trivial.

The preceding discussion is abstract, so we will illustrate it on a sample diagram. For this purpose, we use diagram 3, which shows a few actions, with a few atoms. The first action links the unique B to a unique E.

Parsing of Slow Actions

Slow verbs have a time delay, so the algorithm of the previous section must be modified to include them. The way we do this is as follows:

As before, we separate the case with unique inputs from the case that does not involve unique inputs. In the case where all the inputs to the slow verb are ubique or common, calculate the forward and backward rate of the slow verb. Then generate two Poisson distributed random variables with mean equal to the forward and backward rate multiplied by epsilon. We then take the two numbers and put them in a data-structure called a queue, which is just a structure which stores the numbers until they are needed. Then get from the queue the numbers that were stored a time T ago (this is a new parameter of the slow action—the delay time). These are added to the outputs and subtracted from the inputs.

The interpretation of slow verbs is not essential to the language, but we found it useful, so we include it here for completeness. The parsing of slow actions doesn't change the parsing of the grammatical elements—the likebox and linkbox.

Minimal (Ahisorical) Parsing of Diagrams with Likeboxes that Only Nest: No Equivalences Linkboxes, Compartments, or Resolutions Now we come to the heart of the matter—we must reduce the objects with grammar in the language to the relatively simple type of diagrams which we described how to mechanically parse in the previous section. These are diagrams with only atoms and actions.

In the case where likeboxes appear, they may nest arbitrarily deeply. The goal is to reduce the diagram to the case where no likeboxes appear, which is then parsed as above. We don't have to deal with equivalence lines yet. Furthermore, there is a special simple case where the likeboxes are accidentally nested in a tree which is easier to parse. We define the parsing of this case first. When we define general parsing, this algorithm will no longer appear as part of the parsing algorithm. But it will still be useful as an optimization technique, loosely analogous to the optimization called loop-unrolling in the design of compilers for high level languages familiar to those of average skill in the art of optimizing compiler design. The distinction between parsing and optimization is always a bit foggy because what looks like a parsing algorithm in one point of view sometimes becomes an optimization in another point of view. Both are recursive algorithms that interpret a language structure, and transform it into another structure.

But enough philosophy—On to the parsing! The likeboxes are said to form a tree when no likebox contains itself as a member, nor does it contain a likebox that contains it as a member, or a likebox that contains a likebox that contains it as a member, etc. and when no two likeboxes overlap. This is a very special case, because there are no restrictions on likeboxes in the general abstract diagram. Likeboxes in general may even contain themselves as members. But it is actually commonly the case in diagrams that are drawn that the likeboxes form a tree. This is because when likeboxes are drawn on a flat piece of paper in such a way that they do not overlap. Then every likebox is entirely inside another, which is entirely inside another, etc, until we reach the top level, which is a likebox not contained in any other one. Then every likebox has a nesting level, which is defined as zero for top-level likeboxes, one for likeboxes which are members of level zero likeboxes, two for likeboxes which are members of level one likeboxes, and so on. Then we label the atoms which are not likeboxes with a level equal to one more than the level of the highest-level likebox they are members of. The level of an atom which is not a member of any likebox is zero. Now all nouns, likeboxes and atoms, have a level.

We will restrict the actions by a technical condition—every reversible action can only have nouns of the same level as input and output, and irreversible actions may only connect to output lines which end on nouns of a lower level than the level of any of the nouns they connect to as input. In other words, reactions can only increase the level of any noun. This condition prevents recursion in the likebox diagram, and allows us to completely reduce the model to a likebox free model.

At the first stage, all the likeboxes are named and their contents numbered. In an abstract diagram, the likebox contents are already numbered by the order in which the references appear in the list of members inside the likebox. Since we are not parsing resolutions, it doesn't matter how the contents are numbered, but we are free to do so in English-reading order if the diagram is presented as a drawing, so that the numbering is the same as the one that was introduced earlier when discussing resolutions.

Now we can define the parsing algorithm recursively: The method is defined on the top level likeboxes. We take any of the reactions or slow actions that connect to a level zero likebox with M members. We then duplicate the reaction or slow action M times, keeping the parameters of the action the same, and on each of the copies, we replace the line that ended on the likebox with a line that ends on one of the members. We delete the original action. The line that used to end on the likebox now ends on a different member for each of the M copies. The remaining lines all end in the same position.

This algorithm reduces the diagram by a recursive algorithm to one in which there are no likeboxes and which is parseable by the previous method. Unfortunately, it is very brutal—it does not distinguish between different histories of formation of the different atoms. We do not describe less brutal method in this disclosure, but with the restrictions of this section, it is possible to do so.

Figure 19:
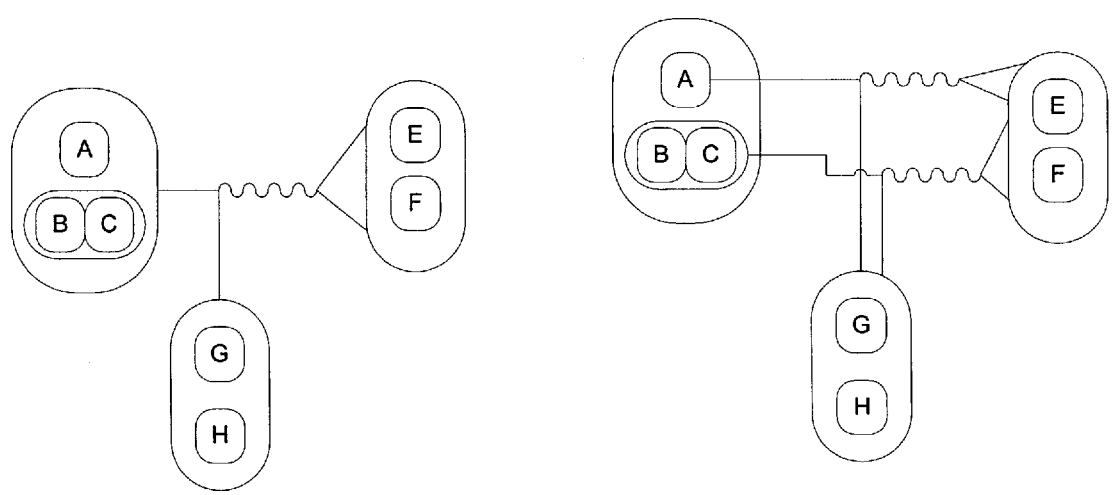
FIG. 19 illustrates an example of recursive resolution of a polymer.

One step of the parsing algorithm is illustrated in FIG. 19. The left side of the diagram shows a nested likebox structure, while the right side shows the diagram after one step of parsing.

We perform the algorithm above until no more lines end on likeboxes of order zero. Then we can delete all the likeboxes of order zero, because no lines end on them. Once these boxes are deleted, the levels of all the other likeboxes decrease by one, and we can repeat the process on those.

Since we have decreased the level of all the likeboxes, we will eventually remove all likeboxes, and reduce the diagram to the form that contains no likeboxes. Once we have a diagram with no likeboxes, we can convert it into a model by the methodology of the previous section.

This method is guaranteed to terminate under the conditions we have listed. These conditions can be considered as defining a sub-language of likeboxes only, with a crazy verb-restriction.

Parsing of Linkboxes and Likeboxes When the Two Objects Form A Tree: No Equivalence Lines or Verbboxes, No Resolutions, No Interior Linkboxes, No General Linkboxes and No General Likeboxes: the Implicit Likebox Rule Part II The next case we consider is the parsing of likeboxes and linkboxes in the case where the likeboxes are a tree, just as in the previous section, and only contain entire linkboxes. In other words, they do not overlap with linkboxes. Yet again, all the likebox members are either entire linkboxes or atoms. They also don't overlap with each other, nor do they contain themselves. They are still entirely hierarchical.

In this case also, we must generalize the action condition of the previous section. We define the level of an atom to be its likebox nesting level, in the exact same way as in the previous section, for all the atoms not contained in a linkbox. The atoms that are not in any likebox are level zero; the atoms in the first layer of likeboxes are level one, and so on. We define the level of a linkbox as the level it would have if it was an atom. So that linkboxes not contained in any likebox are level zero, linkboxes contained in a likebox which is not a member of another likebox are level one, and so on. Just like for atoms. Finally, we define the level of an atom inside the linkbox as the level of the linkbox plus one. Again we forbid actions which take nouns to nouns of a higher level, in precisely the same way as in the previous section.

This is another special case of tree-nested likeboxes, and we can reduce it to the previous one by the method of implicit likeboxes.

Figure 20:
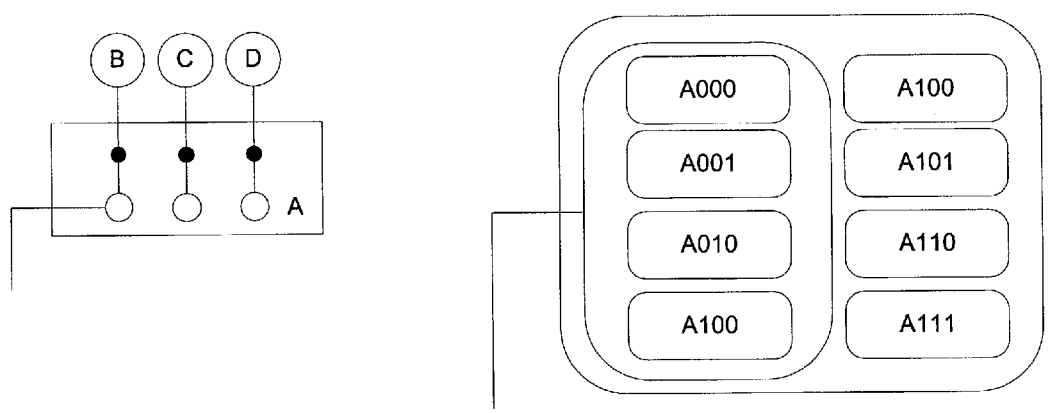
FIG. 20 illustrates an example of recursive resolution of the DNA structure.

We identify the implicit likeboxes of the linkbox, and then we replace the linkbox with a likebox containing all its possible states, as illustrated in FIG. 20. This is done by enumerating all the states of the linkbox, and producing a likebox containing one atom for each state. The likebox now has as many internal states as the linkbox did have. The linkbox is gone, of course. The atoms in the likebox have the same number-type as the linkbox had. Once we have done this, the diagram contains no linkboxes.

But we must say, What happens to the lines? Lines coming from the linkbox are replaced by lines coming from the likebox which replaces it. But lines coming from an atom inside a linkbox are a new complication. They must come from a likebox containing all the states that this atom was referring to. For example, if the line comes from the atom which is the zero state of the first implicit likebox, as in FIG. 20, then the line should be coming from all the states which are in the zero state in the first implicit likebox. This is illustrated by the parsing in FIG. 20. So we must replace the lines coming from the atoms in a linkbox by lines from a sublikebox of the states that replaced the linkbox.

But these last likeboxes can overlap! For example, if there is a line coming from the atom which is the zero state of the first implicit likebox, it now comes from a likebox which contains all the states whose resolution has a zero in the first position. If there is a line that comes from an atom which is the one state of the second implicit likebox, it comes from all the states whose resolution has a one in the second position. But the state whose resolution has both a zero in the first position and a one in the second position is contained in both of these likeboxes. So the likeboxes can overlap. Are we cooked?

The answer is no—we are saved by the fact that the algorithm we defined in the previous section is impervious to nesting at the lowest level. It is clear by working out examples, although it is a general theorem, that the algorithm still terminates when applied to the likeboxes generated from linkboxes.

Minimal (Nonhistorical) Parsing of Diagrams with Nested Likeboxes and Linkboxes and Nonhistorical Resolution: No History, No Equivalences, No General Linkboxes, and No General Likeboxes The final optimized algorithm that we present will reduce a certain class of resolutions. The way we do this is simply to identify resolved lines with likeboxes wholly contained in others. The conditions for applicability of this algorithm are the same as in the previous section, except now the lines from likeboxes or linkboxes are allowed to have resolutions, so long as the resolutions do not refer to history—that is, they do not have hyphens in them.

The algorithm is simple: if a line from a likebox has a number, we remove the number, and place the line on the corresponding member referred to by that number. If a linkbox has a line with a comma-separated list of numbers, we identify the state that this comma-separated list refers to, and connect that line to the atom that represents that state. For example, we would replace the line in FIG. 11 labeled 0 with a line coming from A, while the line labeled 1 will be replaced with a line coming from B. In FIG. 12, the line labeled 1 1 will be replaced by a line from the likebox with members B and C, and the initial one will be deleted. There is a second one left still, and this will be deleted too, until we are left with a line coming from C. All is as it should be.

Simple Parsing

The simple parsing of a diagram is defined independently from the efficient parsing, and can produce a model of a diagram with arbitrary elements and resolutions in principle. We do not define the parsing of general compartments (more general than just linkboxes), equivalences, bind-equivalences, or fast verbs, since these are more involved. We only define the action on linkboxes and likeboxes.

A model in this algorithm has data which is completely different from the data in the efficient algorithm. Recall that there we stored an integer for every common atom, replaced all the unique atoms with implicit likeboxes and had a real valued concentration associated to every ubique.

In the simple algorithm we still have a real valued concentration associated with every ubique, but the other nouns have a collection of data structures called realized objects associated with them. Each realized object is a reference to a diagram object and a string containing its history. As the model is run, the objects are changed, and their history is extended. This is the major inefficiency in this method of modeling, the amount of data required to store each object grows linearly with time, to keep track of everything that has happened to the object since the beginning of the program. The gain is that the diagram may be made into a model with no complicated transformations required first.

The simulation method requires an interpretation of the verbs. We use an interpretation for this algorithm that is very close to the interpretation used in the efficient method. It is loosely analogous to some methods used to model chemical transformations stochastically.

With each slow verb we associate an array of object instances and times. These objects are queued for production at the indicated time.

At every step of the simulation algorithm, we examine every slow verb. If the current simulation time exceeds the time stored with the object instances in the queue, we produce these objects.

At every step of the simulation we examine every action. For every noun, we test its history against the history of the lines entering the action. If the noun is a likebox, we loop over every indirect member of the likebox. For every noun that enters as a catalyzing member, we add the number of its instances multiplied by a weighting factor to the weighted sum of the catalyzing inputs E. For every atom that enters as a promoting member, we add the number of its instances times a factor to the weighted sum of promoting factors P. For every atom that enters as an inhibiting member, we add a factor to the weighted sum of the inhibiting members 1. The weight is a parameter associated with the line. It's the same for every line that enters the action Every verb is checked against every instance of the input nouns to see if this instance can participate in any line. This is the second inefficiency—for reasonable diagrams, the number of different inputs might be superexponentially large. For every combination of instances that can appear as inputs, the rate of the reaction is computed according to the formula $E(k1+P)/(k2+P+I+E)$. This is the very same formula that occurs in the efficient algorithm.

If we call the rates of all the possible actions on the input instances r_i, then the sum of all the r_i is called R. This is the sum total of all the reaction rates.

A random time increment t is generated with exponential distribution $P(t)=\exp(-Rt)$. Then one of the possible actions i is chosen with probability equal to r_i/R. The resulting action is performed—the input instances are destroyed, and, if the action is regular, the outputs are created. If the action is slow, the inputs are destroyed, and the outputs are placed in the queue to be produced at a time which is the current time plus a fixed constant. Each output has the reaction added to its historical resolution.

The new output instances are created in the appropriate instance of the appropriate container with the last reaction prepended by a letter to their history with a hyphen and the history of all the inputs, as described by the history rules.

We note that there are many more parsing algorithms we can give that parse more and more complicated languages in stages, and that combine simple and optimized parsing. Although several parsing algorithms are described, those skilled in the art will realize that parsing algorithms other than the exemplary embodiments described can be used. Accordingly, the invention is not limited to any particular parsing algorithm.

Alternate Embodiments

A formal language for describing for gene and other networks is described. This language makes it possible to describe all the interactions in a cell or other complex system in a single diagram, with a minimal number of symbols. The language is compact and modular, in the sense that complex interactions composed of many subparts may be annotated with the same symbols as the simplest interactions composed of individual molecules or genes.

Also provided is a parsing methodology for the processing and interpretation of networks expressed in the above language. The invention operates broadly by representing biological elements and processes abstractly, as objects in a notational system that are adapted to enable automated parsing and unambiguous modeling. The language comprises multiple grammatical structures and an associated syntax, which are described herein. It is also completely modular in that any other symbology or library of symbols that represent the fundamental elements of the present grammar and syntax are readily useable to model cell behavior.

Furthermore, the ability of this language to represent reactions as nestable (recursive) objects, via the likebox and other structures, means that it can provide a computationally clear and unambiguous model of chemical and biological activities of arbitrary complexity.

The present invention also utilizes an explicit separation in its syntax for reactions (verbs) and atoms (nouns) in order to facilitate the automated parsing of Diagrammatic Cell models. This explicit separation advantageously provides a means for segregating the "known" elements of the reactions from the "unknown."

In typical cellular reactions, the exact mechanisms of the reactions (the verbs in this context) are unknown, while the inputs, outputs, and catalysts (for example) are known. By describing a process in terms of the unknown verbs and known nouns, the present invention modularizes its description into components that can be better identified and described in terms of their characteristics. Such characteristics may include, in some embodiments, reaction rate, time delay, time delay variance, and reactant or catalyst concentration.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

I claim:

1. A method of modeling a system using a diagrammatic language, comprising:
    describing said system using said diagrammatic language to form a diagram; and
    parsing said diagram to form a model of said system, said parsing comprising historical resolution of state;
    wherein said language comprises recursively nestable likeboxes, recursively nestable linkboxes, and implicit likeboxes.

2. A computer system for use in modeling a system with a diagrammatic language, comprising computer instructions for:
    describing said system using said diagrammatic language to form a diagram; and
    parsing said diagram to form a model of said system, said parsing comprising historical resolution of state;
    wherein said language comprises recursively nestable likeboxes, recursively nestable linkboxes, and implicit likeboxes.

3. A computer-readable medium storing a computer program for use in modeling a system with a diagrammatic language, said program executable by a plurality of server computers, said program comprising computer instructions for:
    describing said system using said diagrammatic language to form a diagram; and
    parsing said diagram to form a model of said system, said parsing comprising historical resolution of state;
    wherein said language comprises recursively nestable likeboxes, recursively nestable linkboxes, and implicit likeboxes.

4. A computer data signal embodied in a carrier wave for use in modeling a system with a diagrammatic language, comprising computer instructions for:
    describing said system using said diagrammatic language to form a diagram; and
    parsing said diagram to form a model of said system, said parsing comprising historical resolution of state;
    wherein said language comprises recursively nestable likeboxes, recursively nestable linkboxes, and implicit likeboxes.

5. A method of producing a model using a diagrammatic language, parsed by an algorithm, comprising:
    describing said system using a diagram drawing,
    identifying an abstract diagram structure in said diagram drawing, and
    applying a parsing algorithm to said abstract diagram structure to produce said model.

6. A method of converting a plurality of text strings representative of historical resolutions into information representative of the current state of at least one noun comprising:
    concatenating the history of nouns that input to a verb into the history of the nouns that the verb creates.

7. A method of classifying states of an object comprising:
    identifying unique objects and the transformations among them to classify the states of said object using the method of implicit likeboxes.

8. The method according to claim 7, wherein using the method of implicit likeboxes comprises:
    identifying the equivalence class of unique nouns under the transitive closure of the associative relation of being on opposite sides of a verb.

* * * * *